United States Patent
Sato et al.

(10) Patent No.: US 6,865,072 B2
(45) Date of Patent: Mar. 8, 2005

(54) METAL-ENCLOSED SWITCHGEAR

(75) Inventors: Shinji Sato, Tokyo (JP); Takao Tsurimoto, Tokyo (JP); Kenichi Koyama, Tokyo (JP); Masahiro Arioka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/684,555

(22) Filed: Oct. 15, 2003

(65) Prior Publication Data

US 2004/0104201 A1 Jun. 3, 2004

(30) Foreign Application Priority Data

| Nov. 6, 2002 | (JP) | ................................ 2002-322101 |
| Jan. 14, 2003 | (JP) | ................................ 2003-005162 |
| Jan. 14, 2003 | (JP) | ................................ 2003-005478 |

(51) Int. Cl.[7] ............................................. H02B 5/00
(52) U.S. Cl. ........................ 361/619; 361/604; 361/612; 361/618; 218/155
(58) Field of Search ................................ 361/604, 612, 361/618, 619; 218/155, 68, 69; 200/82 B

(56) References Cited

U.S. PATENT DOCUMENTS

| 4,744,002 | A | * | 5/1988 | Nakano et al. ............. 361/612 |
| 4,967,307 | A | * | 10/1990 | Itou et al. .................... 361/618 |
| 5,898,565 | A | * | 4/1999 | Yamauchi et al. ........... 361/612 |
| 6,005,213 | A | * | 12/1999 | Morita et al. ................ 218/124 |
| 6,278,073 | B1 | * | 8/2001 | Tsuzura et al. .............. 218/43 |
| 6,407,908 | B1 | * | 6/2002 | Iryo et al. .................... 361/604 |
| 6,459,567 | B2 | | 10/2002 | Arioka et al. |
| 6,504,125 | B2 | * | 1/2003 | Nishitani ...................... 218/68 |
| 6,529,368 | B2 | | 3/2003 | Koga et al. |
| 6,559,404 | B1 | | 5/2003 | Ookawa et al. |
| 2002/0060204 | A1 | | 5/2002 | Tohya et al. |

FOREIGN PATENT DOCUMENTS

| EP | 1 054 493 | 11/2000 | |
| JP | 54108241 A | * 8/1979 | ........... H02B/13/06 |
| JP | 01259706 A | * 10/1989 | ........... H02B/13/06 |
| JP | 03082307 A | * 4/1991 | ........... H02B/13/02 |

* cited by examiner

Primary Examiner—Boris Chervinsky
(74) Attorney, Agent, or Firm—Leydig, Voit & Mayer, Ltd.

(57) ABSTRACT

A tank filled with an insulating gas accommodates insulator tubes incorporating vacuum-valve breakers for individual phases. One end of each insulator tube is fixed to the inside of the tank. Each vacuum-valve breaker is installed generally on a common longitudinal axis with the corresponding insulator tube so that a movable electrode rod is directed toward a fixed end of the insulator tube. The insulator tube has as an integral part a bus line fixing portion projecting in a direction intersecting the longitudinal axis of the insulator tube from the proximity of an end opposite to the fixed end, supporting a bus-side conductor in an insulated fashion.

9 Claims, 22 Drawing Sheets

US 6,865,072 B2

METAL-ENCLOSED SWITCHGEAR

BACKGROUND OF THE INVENTION

1. Field of the Invention

The present invention relates to a metal-enclosed switchgear using vacuum-valve breakers.

2. Description of the Background Art

A conventional metal-enclosed switchgear using vacuum-valve breakers is provided with fittings, such as insulators, for supporting bus-side conductor strips on an inner wall of a sealed tank filled with an insulating gas as disclosed in Japanese Laid-open Patent Publication No. 1999-185577, for example.

One problem of conventional metal-enclosed switchgear systems is that it is difficult to reduce their physical size because there are provided insulators and other fittings for supporting the bus side conductor strips on the inner wall of the tank as stated above.

The insulators used in a metal-enclosed switchgear should meet at least the following two requirements:

(1) The insulator should withstand an electromagnetic impact force exerted by the bus-side conductor strips when a short-circuit current flows; and (2) Although one end of the insulator supports the bus-side conductor strip to which a high voltage is applied and the other end of the insulator is fixed to the inner wall of the tank which is grounded, no insulation breakdown should occur between both ends of the insulator.

As it is necessary to ensure compliance with the first requirement, or to maintain the insulator's impact force withstand capability, it is impossible to excessively reduce the diameter of the insulator. This makes it difficult to reduce the width of the conventional metal-enclosed switchgear, or its depth as illustrated in FIG. 3 appended to the aforementioned Patent Publication No. 1999-185577. More specifically, three insulators are arranged side by side in a horizontal plane in the metal-enclosed switchgear of the Publication, so that its width inevitably increases if insulators having a large diameter is used. Taking into account the fact that a specific amount of installation space should be allowed around each insulator, it is even more difficult to reduce the width of the metal-enclosed switchgear.

To ensure compliance with the second requirement, that is the need to prevent insulation breakdown, there is no alternative but to increase the longitudinal length of the insulator. The surface discharge-voltage of an insulator of a specific length is normally lower than the breakdown voltage of a column of gas of the same length. Therefore, when using an insulator, it is inevitable that its length is larger than the length of a column of gas having a corresponding breakdown voltage. Consequently, the size of the switchgear, particularly its depth (left-to-right dimension as illustrated in FIG. 3 appended to the aforementioned Patent Publication), tends to increase.

SUMMARY OF THE INVENTION

In view of the foregoing, it is an object of the invention to provide a metal-enclosed switchgear of which tank can be reduced in size by eliminating the need for insulators for fitting bus-side conductor strips on an inner wall of a tank.

In one principal feature of the invention, a metal-enclosed switchgear includes vacuum-valve breakers, insulator tubes, disconnectors and a metallic enclosure accommodating the vacuum-valve breakers, the insulator tubes and the disconnectors. Each insulator tube is fixed at its one end in an axial direction to the inside of the metallic enclosure, the insulator tube having near its other end in the axial direction a bus line fixing portion for supporting a bus-side conductor in an insulated fashion, and each vacuum-valve breaker is fixed inside the insulator tube, the vacuum-valve breaker having at its one and other ends in the axial direction a movable electrode rod and a stationary electrode rod, respectively. Each disconnector includes a blade support member electrically connected to the movable electrode rod by a connecting conductor and fixed to a peripheral part of the insulator tube, a bus line terminal fixed and connected to the bus-side conductor, and a blade swingably attached to the blade support member at one end such that the other end of the blade can be brought into contact with and separated from the bus line terminal, whereby the blade works as a disconnecting device.

This construction makes it possible to eliminate the need for the provision of insulators for supporting bus-side conductor strips and thereby serves to reduce the size of the metal-enclosed switchgear.

These and other objects, features and advantages of the invention will become more apparent upon reading the following detailed description along with the accompanying drawings.

DESCRIPTION OF THE PREFERRED EMBODIMENTS

First Embodiment

Figure 1:
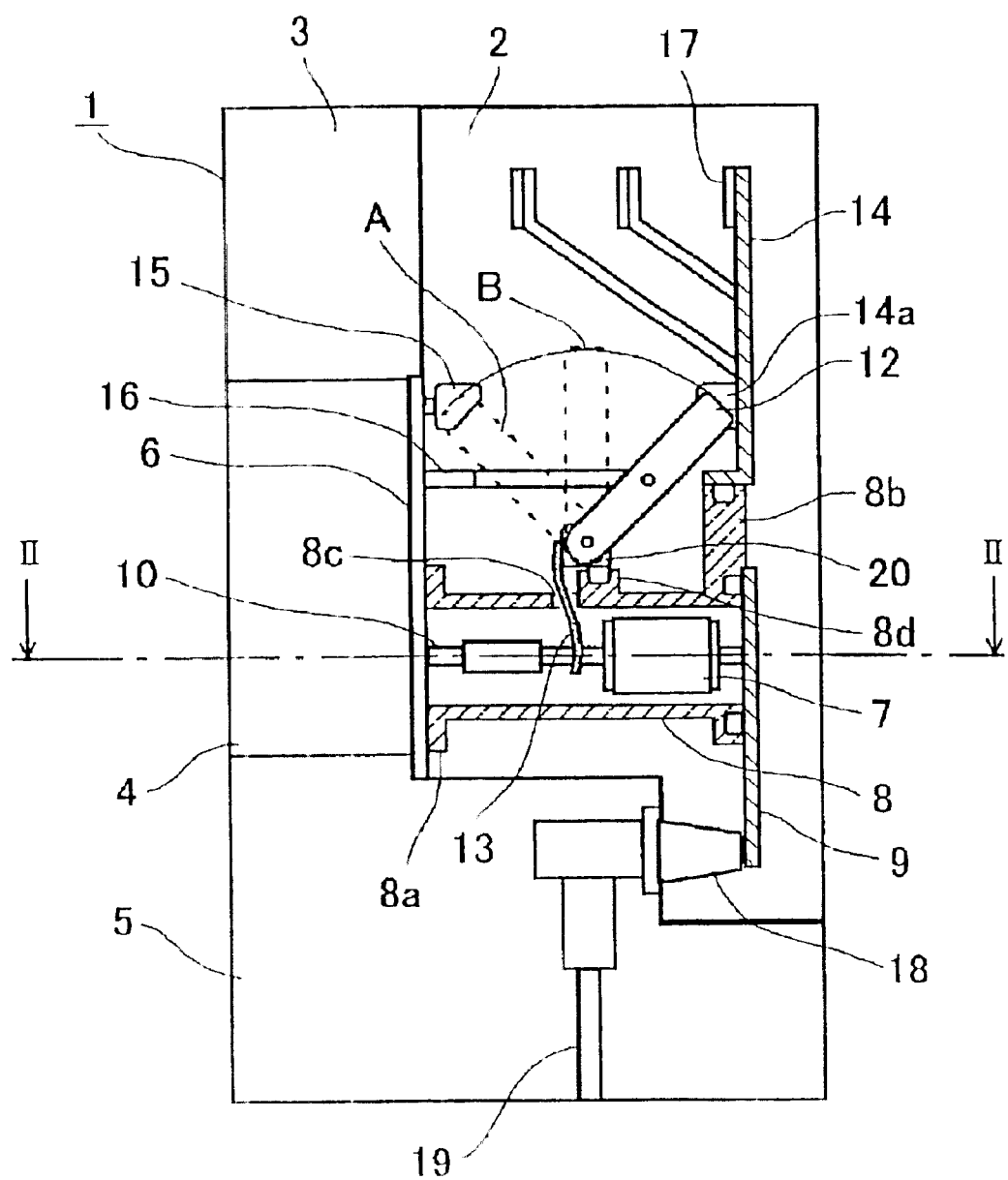
FIG. 1 is a schematic sectional side view of a metal-enclosed switchgear according to a first embodiment of the invention.
Figure 2:
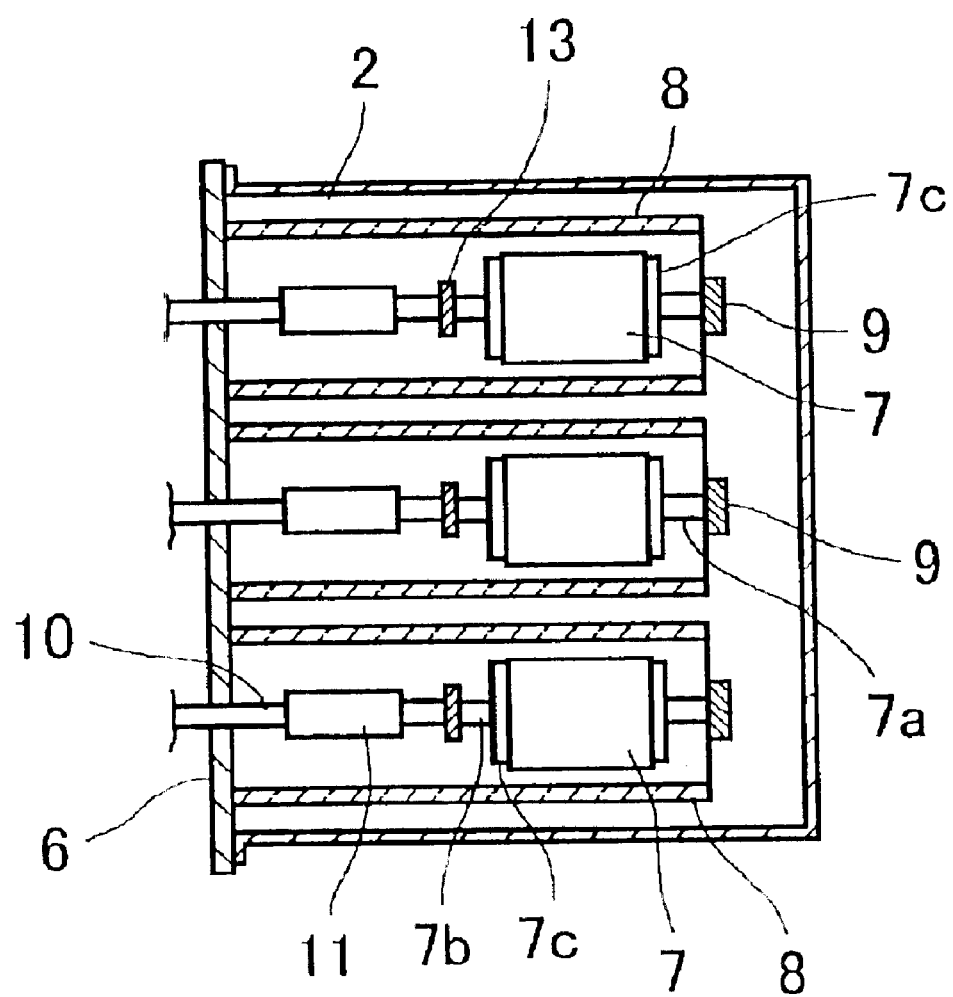
FIG. 2 is a sectional diagram showing principal parts of the metal-enclosed switchgear taken along lines II—II of FIG. 1.

FIG. 1 is a schematic sectional side view of a metal-enclosed switchgear according to a first embodiment of the invention, and FIG. 2 is a sectional diagram showing principal parts f the metal-enclosed switchgear taken along lines II—II of FIG. 1.

The metal-enclosed switchgear has a metallic container 1 of which left side is the front and right side is the rear as illustrated in FIG. 1. The interior of the metallic container 1 is partitioned into multiple sections. These are a tank 2 filled with an insulating gas that is located at an upper rear part, a control compartment 3 located at an upper front part, an actuator mechanism compartment 4, located below the control compartment 3 in a central front part and a cable compartment 5 located at a lowermost part.

At a lower part of the tank 2, there are provided three insulator tubes 8 arranged side by side in a horizontal plane. These insulator tubes 8 accommodate vacuum-valve breakers 7 for individual phases of a power source. Each insulator tube 8 has at its front end (left side as illustrated in FIG. 1) a flange like mounting portion 8a which is fixed to a mounting plate 6 which serves also as a partition separating the interior of the metallic container 1 from the actuator mechanism compartment 4. Made of a solid insulating material such as epoxy resin, each insulator tube 8 includes as its integral part a bus line fixing portion 8b which projects in a direction intersecting a central axis of the insulator tube 8 near its rear end (right side as illustrated in FIG. 1). With this arrangement, each of later-described bus-side conductor strips 14 is firmly fixed to and supported by the corresponding insulator tube 8 by means of the bus line fixing portion 8b.

There is formed a through hole 8c in each insulator tube 8. A blade support portion 8d is formed on a cylindrical outer surface of each insulator tube 8 as its integral part near the through hole 8c.

Each of the vacuum-valve breakers 7 has a vacuum vessel incorporating a stationary electrode and a movable electrode which are not illustrated. The stationary electrode of each vacuum-valve breaker 7 is connected to a stationary electrode rod 7a while the movable electrode is connected to a movable electrode rod 7b. The stationary electrode rod 7a and the movable electrode rod 7b protrude beyond respective end plates 7c of each vacuum-valve breaker 7 in opposite directions along its central axis. Each vacuum-valve breaker 7 is accommodated in such a way that its stationary electrode rod 7a and movable electrode rod 7b are directed to the rear (right side in FIG. 1) and the front (left side in FIG. 1) of the insulator tube 8, respectively. The stationary electrode rod 7a is connected both electrically and mechanically to a load-side conductor 9 which is fixed at the rear of the insulator tube 8.

The movable electrode rod 7b of each vacuum-valve breaker 7 is connected to a vacuum-valve actuator rod 10, which passes through the mounting plate 6, via an insulator rod 11. An approximately front half portion (left half as illustrated) of each insulator tube 8 extending along the central axis of the vacuum-valve breaker 7 serves to provide a proper distance between the vacuum-valve breaker 7 and the mounting plate 6 for ensuring an insulation resistance needed.

The configuration of disconnector and grounding switch units of the switchgear of the first embodiment is now described.

Referring to FIG. 1, a blade support member 20 is attached to the blade support portion 8d which is provided approximately at the middle of the cylindrical outer surface of each insulator tube 8. To affix the blade support member 20 to the blade support portion 8d, the blade support member 20 is directly embedded or screwed to a nut, (not shown) which is embedded during a molding process, for example. Each blade 12 swingably supported by the blade support member 20 is electrically connected to the movable electrode rod 7b of the corresponding vacuum-valve breaker 7 by a flexible connecting conductor 13 which is routed through the through hole 8c in each insulator tube 8.

The bus line fixing portion 8b provided at the rear end of each insulator tube 8 is formed projectingly in a vertical direction by a specific length as illustrated to provide a proper distance between the load-side conductor 9 and the bus-side conductor strip 14 for ensuring surface insulation. An extreme end of the bus line fixing portion 8b is fixed to a lower end of the relevant bus-side conductor strip 14.

Each bus-side conductor strip 14 has at its particular location a bus line terminal 14a which is in contact with the blade 12 when flowing an electric current. On the other hand the mounting plate 6 has at its particular locations inside the tank 2 grounding terminals 15 with which the blades 12 of the individual insulator tubes 8 come in contact when the vacuum-valve breakers 7 are grounded. The blades 12 are caused to swing as shown by broken lines in FIG. 1 by means of blade operating members 16 from the actuator mechanism compartment 4 located at the front of the tank 2. The vacuum-valve breaker 7 is in an ON (closed) state flowing an electric current when the pertinent blade 12 is positioned as shown by solid lines in FIG. 1 where its extreme end is in contact with the bus line terminal 14a. The vacuum-valve breaker 7 is in a grounded state when the blade 12 is positioned as shown by broken lines A where its extreme end is in contact with the grounding terminal 15. Also, the vacuum-valve breaker 7 is in an OFF (open) state when the blade 12 is positioned as shown by broken lines B at a middle position between the ON state and grounded state positions.

The metal-enclosed switchgear of this embodiment is for a three phase system, employing three disconnector and grounding switch units which are built with modular design. These disconnector and grounding switch units have substantially the same configuration, each incorporating the vacuum-valve breaker 7, the insulator tube 8, the blade 12, and so forth, as discussed above. The disconnector and grounding switch units of the three phases together constitute a single structure and are operated in an integrated fashion. The load-side conductor 9 to which each vacuum-valve breaker 7 is fixed is connected to a cable 19 via a bushing. 18, and the individual bus-side conductor strips 14 are connected to respective bus bars 17.

Now, operation of the metal-enclosed switchgear of the first embodiment is described.

In this metal-enclosed switchgear, the blade 12 serving as an essential element of both a disconnector and a grounding switch is forced against the relevant bus line terminal 14*a* with a sufficient contact pressure by a spring (not shown) to prevent their contact points from being separated due to an electromagnetic repulsion force occurring when a short-circuit current flows. For this reason, a considerable force is exerted on the bus line terminal 14*a* and the bus-side conductor strip 14 due to friction between the contact points when opening and closing the disconnector (the blade 12 and the bus line terminal 14*a*).

When a short-circuit current flows, a considerable electromagnetic force is exerted on the bus-side conductor strip 14 and the blade 12 which is used for disconnecting and grounding each phase. Therefore, if the bus-side conductor strip 14 or the blade 12 is not fixed firmly enough, they could be deformed. In the metal-enclosed switchgear of this embodiment, however, the bus-side conductor strip 14 is firmly fixed to the bus line fixing portion 8*b* which is formed as an integral part of the insulator tube 8, so that the bus-side conductor strip 14 can sufficiently withstand the aforementioned mechanical and electromagnetic forces.

The bus-side conductor strips are supported by the inner wall of the tank by means of insulators in the conventional metal-enclosed switchgear as mentioned earlier. Because such supporting insulators form surface discharge paths between the high-voltage conductors and the ground potential, the provision of the insulators results in a decrease in insulation resistance, making it necessary to provide a large insulating distance. Since the metal-enclosed switchgear of the invention does not employ such supporting insulators, it is possible to reduce the distance between the bus-side conductor strip 14 and walls of the tank 2.

As thus far described, the disconnector, the bus-side conductor strip 14 and the load-side conductor 9 are provided on each insulator tube 8 containing the vacuum-valve breaker 7 according to the first embodiment. This construction helps prevent partial discharge and disruptive discharge at high-potential terminal portions of the vacuum-valve breaker 7 due to a discharge barrier effect and makes it possible to reduce the size of the metal-enclosed switchgear compactly incorporating the function of the disconnector. The invention provides a method for supporting the bus-side conductor strips 14 in such a manner that they can withstand forces exerted on them when the disconnectors, or the blades 12, are pushed in and pulled out as well as the electromagnetic force caused by the flow of electric currents without the need for any supporting insulators for fixing the bus-side conductor strips 14 or the bus line terminals 14*a* to the wall of the tank 2. This produces such advantageous effects as a reduction in the number of components, compact design of the switchgear as a result of a reduction in insulating distance, and low cost.

Furthermore, since both the blade 12 constituting the disconnector and the bus line terminal 14*a* are fixed to the single insulator tube 8, it is possible to eliminate the need for fine adjustment for ensuring smooth contact between the disconnecting blade 12 and the bus line terminal 14*a*, as compared to the earlier-described construction of the prior art. This further produces such advantageous effects that the switchgear can be assembled in a short time, resulting in a reduction in assembly cost.

While the foregoing discussion of the first embodiment has illustrated a case where the bus line fixing portion 8*b* extends in a direction generally perpendicular to the central axis of the insulator tube 8, the angle between the bus line fixing portion 8*b* and the central axis of the insulator tube 8 need not necessarily be a right angle. Although the bus line fixing portion 8*b* is one-piece molded with the insulator tube 8 in this embodiment, the insulator tube 8 and the bus line fixing portion 8*b* need not necessarily be one-piece formed. Also, the insulator tube 8 and the bus line fixing portion 8*b* need not necessarily be made of molded epoxy resin, but other insulating resin having similar properties may be used without any specific limitations. In addition, it should be apparent for those skilled in the art that various changes and modifications are possible in the shape of the mounting portion 8*a* of the insulator tube 8, the method of connection between the blade 12 and the movable electrode rod 7*b*, and other details of the construction.

Second Embodiment

Figure 3:
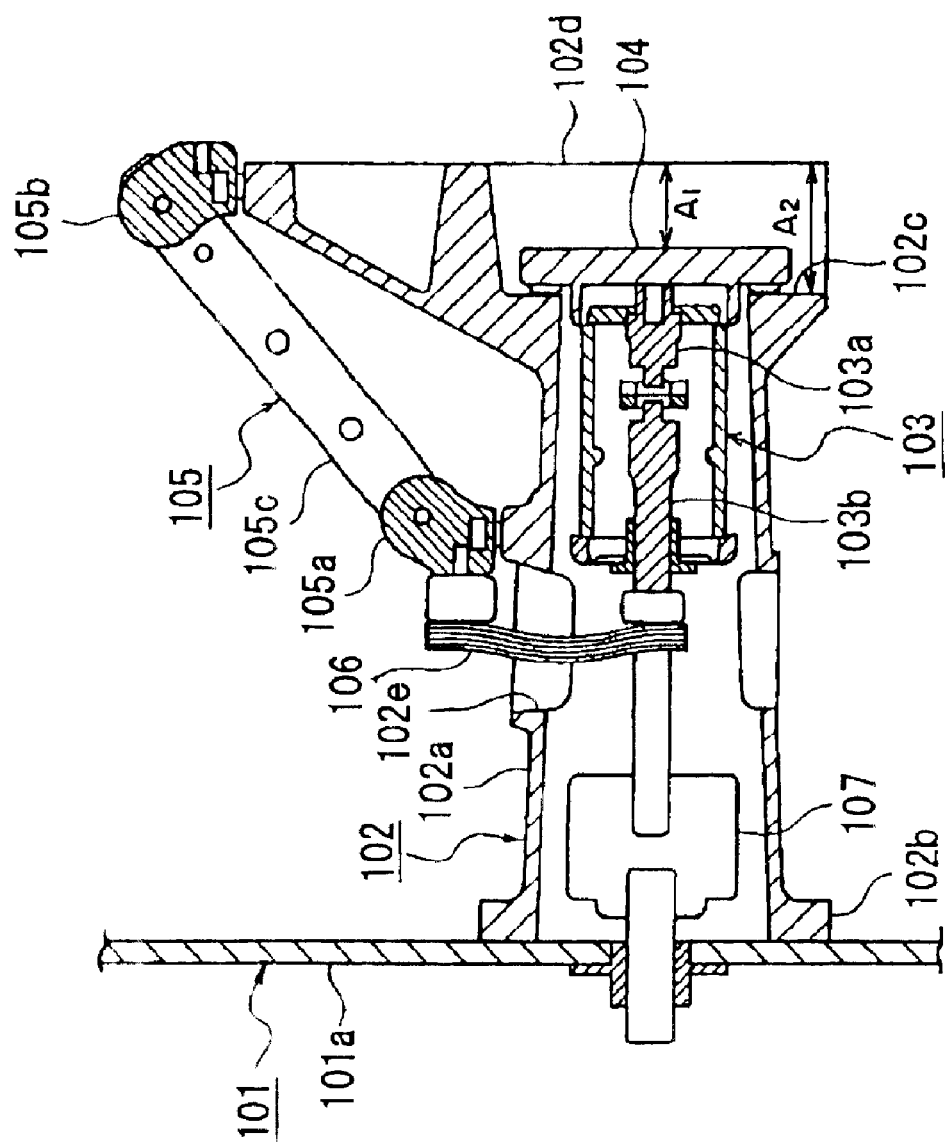
FIG. 3 is a sectional diagram showing principal parts of a metal-enclosed switchgear according to a second embodiment of the invention.
Figure 4:
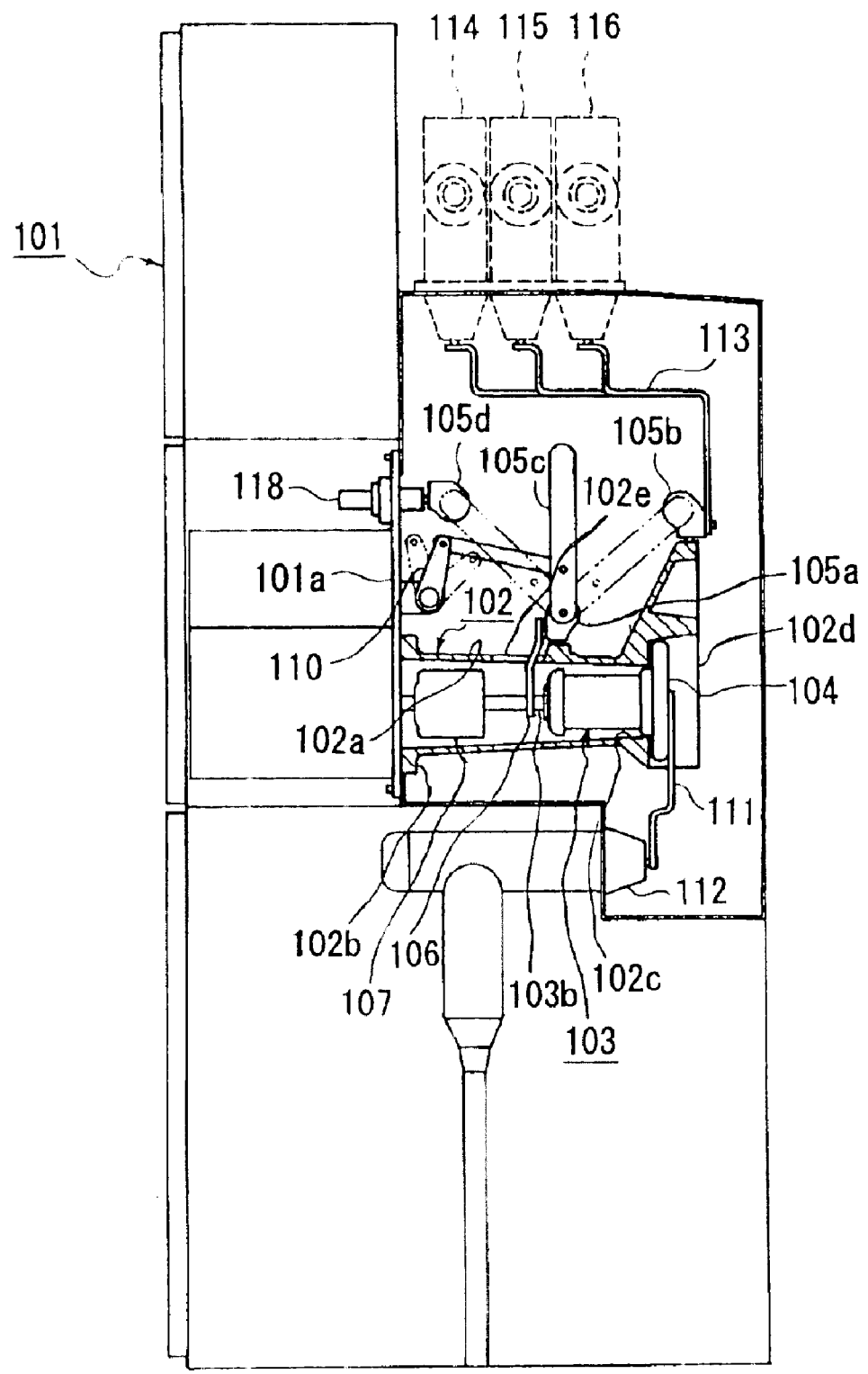
FIG. 4 is a sectional diagram showing the whole of the metal-enclosed switchgear of the second embodiment.
Figure 5:
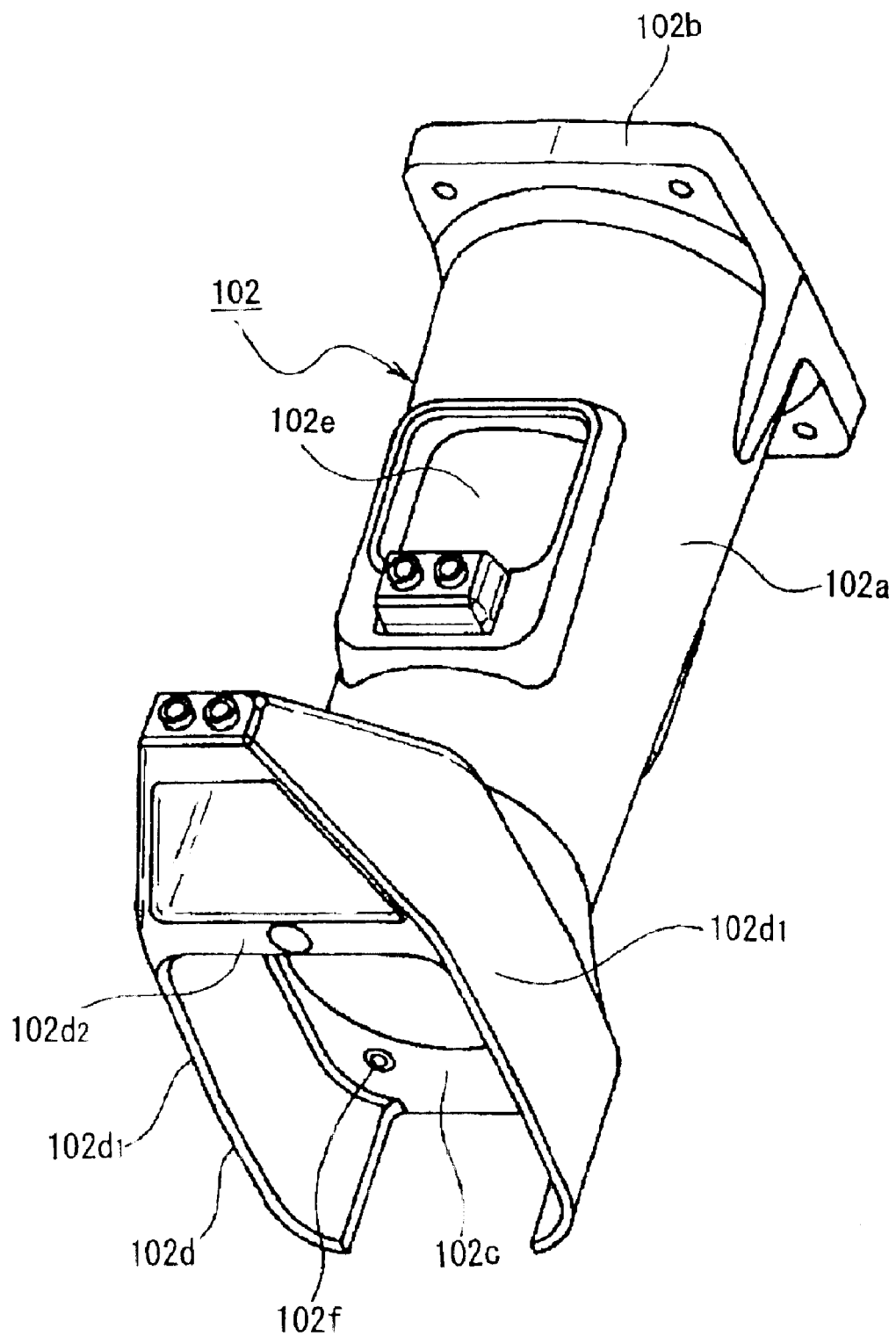
FIG. 5 is a perspective view of a generally cylindrical insulator housing used in the switchgear of the second embodiment.
Figure 6:
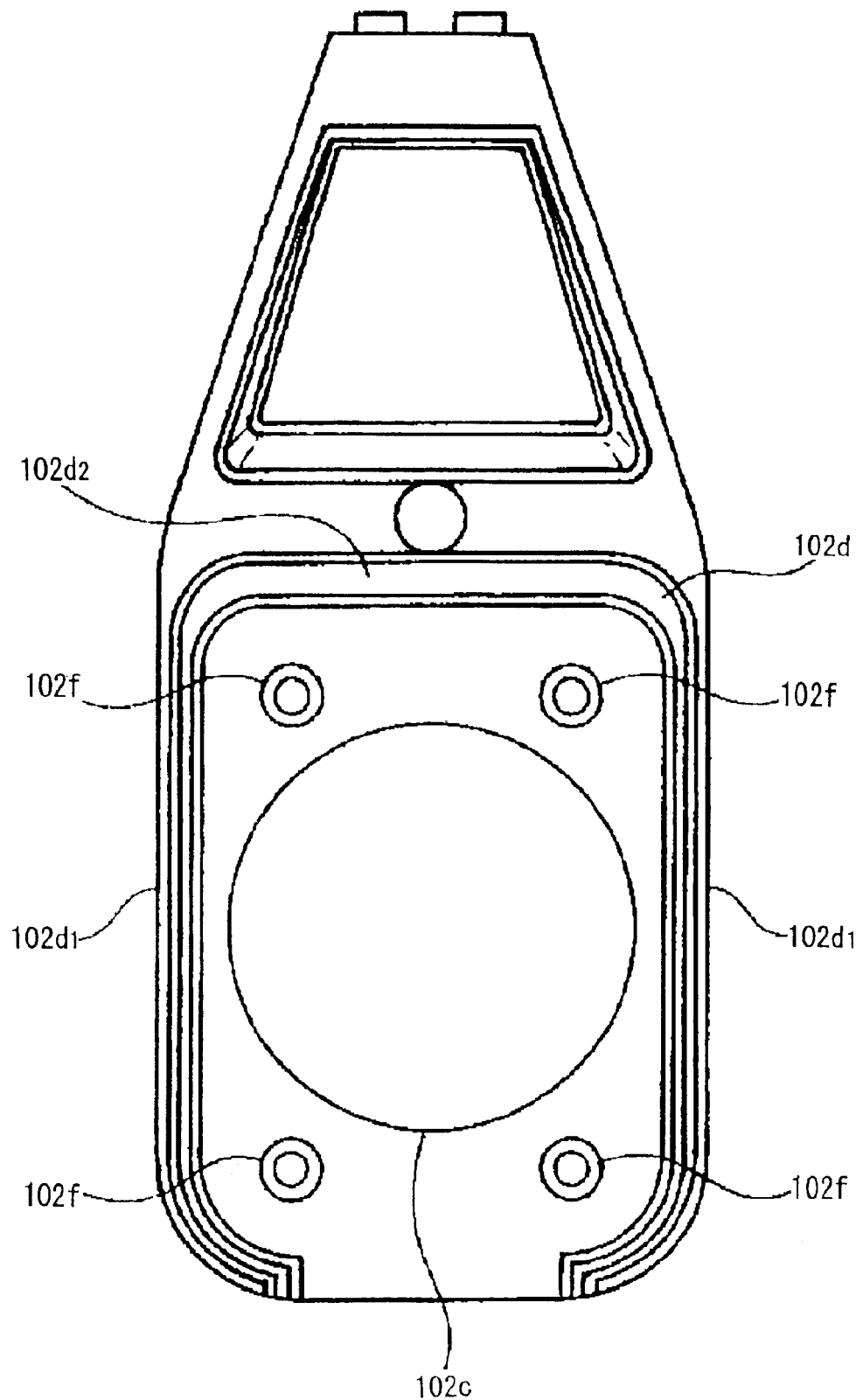
FIG. 6 is an elevational view of the cylindrical insulator housing of FIG. 5 as it is seen from an open end portion side.
Figure 7:
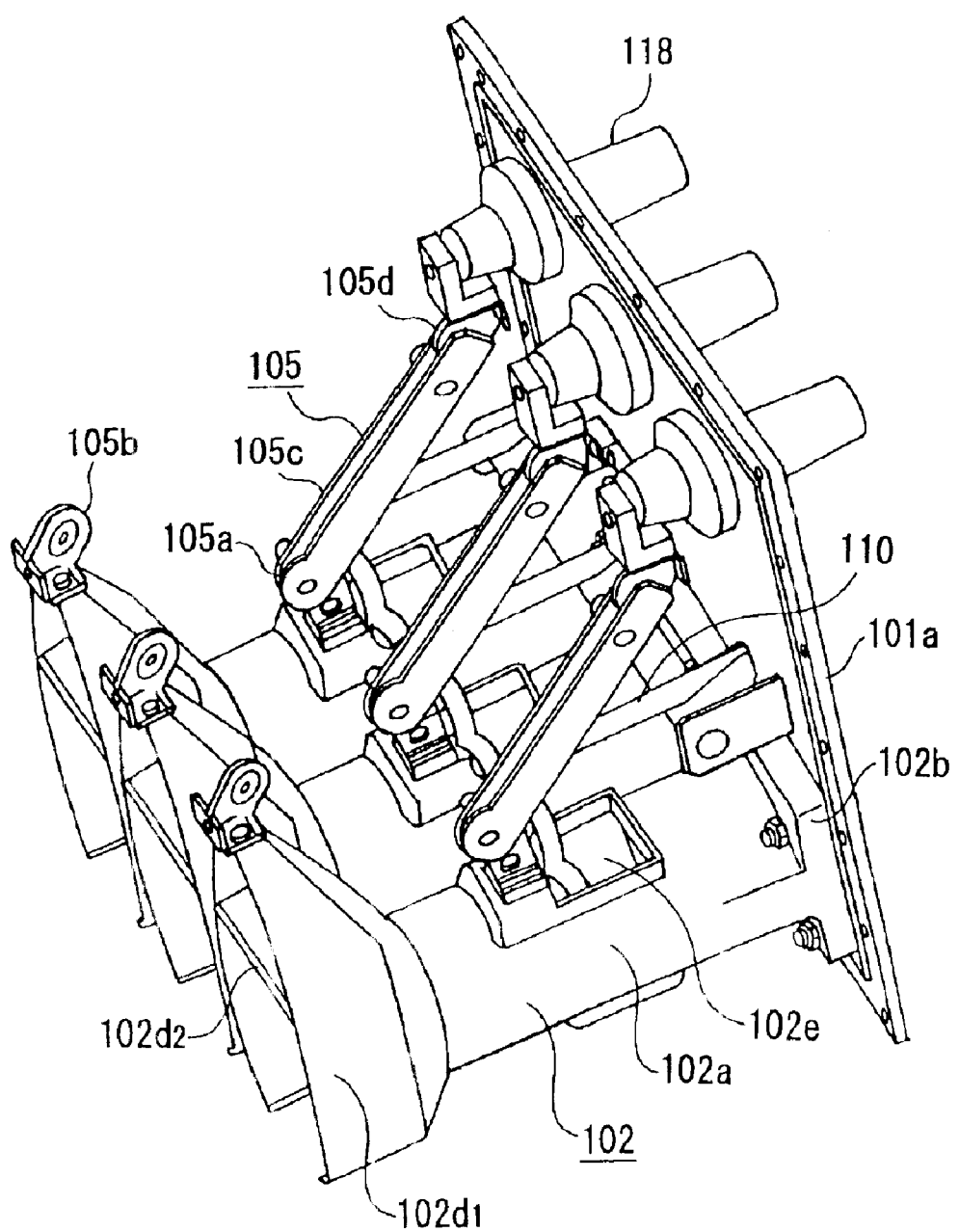
FIG. 7 is a perspective view showing how cylindrical insulator housings for three phases are arranged.

FIG. 3 is a sectional diagram showing principal parts of a metal-enclosed switchgear according to a second embodiment of the invention, FIG. 4 is a sectional diagram showing the entire metal-enclosed switchgear, FIG. 5 is a perspective view of one of generally cylindrical insulator housings 102 serving as insulator tubes, FIG. 6 is an elevational view of the cylindrical insulator housing 102 of FIG. 5 as it is seen from the side of an open end portion 102*c*, and FIG. 7 is a perspective view showing how the cylindrical insulator housings 102 for three phases are arranged.

Referring to FIGS. 3 and 4, the metal-enclosed switchgear has a sealed enclosure (metallic enclosure) 101 in which the individual cylindrical insulator housings 102 are fixed side by side. Made of an insulating material such as epoxy resin, each cylindrical insulator housing 102 has a cylindrical portion 102*a* and a flange portion 102*b* formed at one end of the cylindrical portion 102*a*. There is provided a support plate 101*a* mounted in an upright position inside the sealed enclosure 101 on its front side. The support plate 1101*a* serves as a supporting surface as well as a reference plane for positioning individual constituent components provided inside the sealed enclosure 101. Each cylindrical insulator housing 102 is installed in a horizontal position with its flange portion 102*b* bolted to the support plate 101*a*. The cylindrical insulator housings 102 are provided for the individual phases as shown in FIG. 7. Thus, a total of three cylindrical insulator housings 102 are arranged side by side in a direction perpendicular to the page of FIG. 3.

One each vacuum-valve breaker 103 is accommodated in the individual cylindrical insulator housings 102 as shown in FIGS. 3 and 4. There is fixed an intermediate conductor 104 at the open end portion 102*c* which is located at one end of each cylindrical insulator housing 102 opposite to the flange portion 102*b* of the cylindrical portion 102*a*. Made of a conductive material, the intermediate conductor 104 is formed into a generally rectangular plate like shape, constituting a stationary conductor side exposed portion of the vacuum-valve breaker 103. The intermediate conductor 104 has a grip projecting into an internal space of the cylindrical portion 102a of the cylindrical insulator housing 102. The grip of each intermediate conductor 104 grasps an end portion of a stationary terminal (stationary electrode rod) 103a of the vacuum-valve breaker 103, whereby the vacuum-valve breaker 103 is fixed to the open end portion 102c of the cylindrical portion 102a of the cylindrical insulator housing 102. Also, a central portion of the intermediate conductor 104 is electrically connected to the stationary terminal 103a of the vacuum-valve breaker 103. The intermediate conductor 104 is firmly bolted to four internally threaded holes 102f shown in FIGS. 5 and 6.

Referring again to FIGS. 3 and 4, a disconnector 105 is supported on an outer side wall of each cylindrical insulator housing 102. The disconnector 105 includes a fulcrum portion 105a serving as a blade support member, an closed-side fixture 105b constituting a bus line terminal which is fixedly joined to a later-described bus-side conductor strip (bus bar), a blade 105c and a ground-side fixture 105d (FIG. 4) serving as a grounding terminal. The blade 105c is supported swingably about the fulcrum portion 105a provided on the outer side wall of the cylindrical insulator housing 102. As the blade 105c is turned about the fulcrum portion 105a, an extreme end portion of the blade 105c engages with and disengaged from the closed-side fixture 105b and the ground-side fixture 105d alternately. The disconnector 105 thus constructed is actuated by an actuator mechanism (link mechanism), 110 shown in FIG. 4. Controlled by the actuator mechanism 110, the disconnector 105 is caused to take one of three positions, that is, an open position (OFF state) shown by solid lines in FIG. 4, a closed position (ON state) where the blade 105c is in contact with the closed-side fixture 105b, and a grounded position (grounded state) where the blade 105c is in contact with the ground-side fixture 105d.

There is formed a side opening 102e in the side wall of each cylindrical insulator housing 1.02 as shown in FIG. 3. A movable terminal (movable electrode rod) 103b of each vacuum-valve breaker 103 is connected to the fulcrum portion 105a of the disconnector, 105 by a flexible conductor 106 which is passed through the side opening 102e in the cylindrical insulator housing 102. Made of a flexible conductive material, the flexible conductor 106 flexibly deforms as the vacuum-valve breaker 103 is opened and closed. Each cylindrical insulator housing 102 further incorporates an insulation rod 107 which transmits actuating forces for opening and closing contacts of the vacuum-valve breaker 103 while insulating the contacts from an external actuating device.

Referring to FIGS. 5 and 6, there is formed a first insulating barrier 102d at the open end portion 102c where the intermediate conductor 104 of each cylindrical insulator housing 102 is provided, the first insulating barrier 102d covering three sides of the intermediate conductor 104. Extending outward from the open end portion 102c of the cylindrical portion 102a of each cylindrical insulator housing 102, the first insulating barrier 102d is one-piece formed with the cylindrical portion 102a. While the intermediate conductor 104 extends outward from the open end portion 102c by a specific amount, the intermediate conductor 104 is covered on three sides by the first insulating barrier 102d which extends farther outward than the intermediate conductor 104. The first insulating barrier 102d includes a pair of horizontal-direction barrier portions $102d_1$ for increasing breakdown voltage between the cylindrical insulator housings 102 of adjacent phases and a vertical-direction barrier portion $102d_2$ provided on the side of the disconnector 105. There is not provided any barrier portion on the opposite side of the vertical-direction barrier portion $102d_2$ because a later-described bus bar 111 is provided there.

Returning to FIG. 3, it is preferable that the amount of extension $A_1$ of the first insulating barrier 102d beyond a principal surface of the intermediate conductor 104, or a substantial barrier height $A_1$, be larger than 0 mm ($A_1$>0 mm). Therefore, an apparent barrier height A2 (which corresponds to the "insulation barrier height" referred to in appended claims 4 and 5) should preferably be larger than the height of an exposed conductor portion of the intermediate conductor 104 which constitutes stationary conductor side exposed portion of the vacuum-valve breaker 103.

When the bus bar 111 is connected to the surface of the intermediate conductor 104 as shown in FIG. 4, the exposed conductor portion includes the thickness of the bus bar 111 in addition to the exposed height of the intermediate conductor 104 in the strict sense. When the width of the bus bar 111 is much smaller than that of the intermediate conductor 104 and the width of the aforementioned exposed portion decreases in a steplike fashion with its height, however, an electric field pattern in the vicinity of the exposed conductor portion is almost determined by the shape of the intermediate conductor 104. Therefore, the insulation barrier height can be determined by the height of the intermediate conductor 104 alone.

If the width of the bus bar 111 is approximately equal to or larger than the outside dimension of the intermediate conductor 104, however, the height of the exposed conductor portion is given as the sum of the exposed height of the intermediate conductor 104 and the thickness of the bus bar 111 and, therefore, the insulation barrier height should preferably be made larger than this sum.

Reasons why the insulation barrier height is set as mentioned above will be later discussed in detail.

Returning again to FIG. 4, the intermediate conductors 104 of the individual cylindrical insulator housings 102 are electrically connected to lower bushings 112 by the bus bars 111. On the other hand, the closed-side fixtures 105b of the individual-disconnectors 105 are electrically connected to upper bushings 114, 115, 116 provided on a top surface of the sealed enclosure 101 by bus bars 113. Also, there are provided grounding switch terminals 118 which are electrically connected to the ground-side fixtures 105d of the individual disconnectors 105 on a front-side wall of the support plate 101a.

Figure 8:
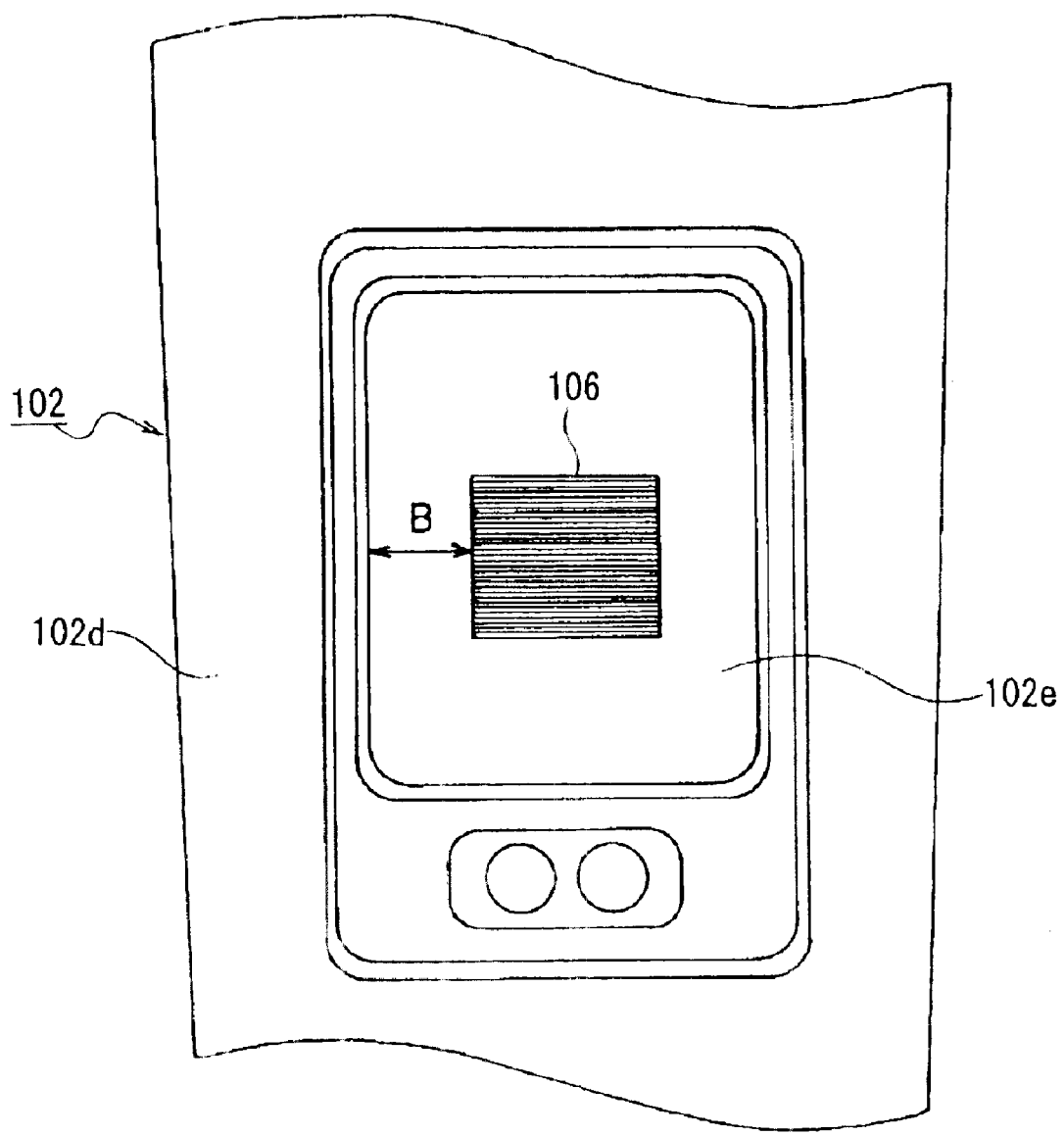
FIG. 8 is an enlarged view of a portion of each cylindrical insulator housing near its side opening.

FIG. 8 is an enlarged view of a portion of each cylindrical insulator housing 102 near its side opening 102e. This Figure shows a cross section of the flexible conductor 106. The distance B between the flexible conductor 106 and side edges of the side opening 102e should preferably be in a range of 15 to 30 mm, more preferably 23 mm, as will also be later discussed in detail.

Given below are examples of appropriate insulating gases to be filled in the sealed enclosure 101:
(1) Dehydrated air
(2) Nitrogen
(3) Mixture of nitrogen and oxygen
(4) Mixture of nitrogen, oxygen and air
(5) Sulfur hexafluoride
(6) Mixture of sulfur hexafluoride and nitrogen
(7) Mixture of sulfur hexafluoride and air (8) Mixture of sulfur hexafluoride and dehydrated air Any of these gases, whichever selected, may be filled at a pressure higher than the atmospheric pressure.

Benefits of the metal-enclosed switchgear of the second embodiment thus constructed are now described.

First, the construction of the second embodiment makes it possible to reduce the overall size of the switchgear due to the provision of the insulating barrier 102d. Each cylindrical insulator housing 102 has the first insulating barrier 102d one-piece formed with the cylindrical portion 102a, at the open end portion 102c, the first insulating barrier 102d covering at least part of the periphery of the intermediate conductor 104. The first insulating barrier 102d includes the left and right horizontal-direction barrier portions $102d_1$ and the vertical-direction barrier portion $102d_2$. The horizontal-direction barrier portions $102d_1$ serve to increase the insulation breakdown voltages between phases (i.e., between the intermediate conductors 104 of the adjacent phases) and between the individual phases and ground level (i.e., between the intermediate conductors 104 and walls of the sealed enclosure 101).

On the other hand, the vertical-direction barrier portions $102d_2$ serve to increase the insulation breakdown voltage between the intermediate conductors 104 and the respective closed-side fixtures 105b, or the breakdown voltage against a voltage applied across electrodes of each disconnector 105 when the blade 105c of the disconnector 105 is opened and the vacuum-valve breaker 103is closed. The distance needed for ensuring a proper insulation resistance at each relevant section may be reduced as much as the breakdown voltage is increased.

Although the provision of the first insulating barrier 102d causes some dimensional increase in its projecting direction, it serves to reduce the dimensions of each cylindrical insulator housing 102 as a whole, producing an advantageous effect that the overall dimensions of switchgear equipment can be reduced.

Second, because the first insulating barrier 102d is one-piece formed with the cylindrical portion 102a of each cylindrical insulator housing 102, rather than separately from the cylindrical portion 102a, the dimensions of the switchgear equipment can be efficiently reduced. If a separate insulating barrier is provided instead of the first insulating barrier 102d, there will arise the need for an additional space around the cylindrical insulator housing 102 for supporting the insulating barrier, and this will lessen the effect of reducing the dimensions of the switchgear equipment. The provision of the first insulating barrier 102d one-piece formed with the cylindrical portion 102a of the cylindrical insulator housing 102 serves to simplify the internal structure of the switchgear, thereby producing an increased effect of reducing its dimensions.

Third, the construction of this embodiment is advantageous in that it serves to reduce the cost of assembly. Although the sealed enclosure 101 slightly deforms due to the pressure of the insulating gas filled in it, the disconnectors 105 are kept at correct positions with respect to the respective cylindrical insulator housings 102 because the cylindrical insulator housings 102 are fixed to the support plate 101a which serves as the reference plane for positioning the individual constituent components and the vacuum-valve breakers 103 and the disconnectors 105 are affixed to the cylindrical insulator housings 102. This serves to reduce the time needed for fine adjustment in assembly process as well as the cost of assembly.

Fourth, the construction of the embodiment is advantageous in that it serves to reduce component cost. In the metal-enclosed switchgear of the embodiment, the vacuum-valve breaker 103 and the disconnector 105 are fixed to each of the cylindrical insulator housings 102 of the same design made of the insulating material. Since insulating structural components are standardized in this way, the number of components and the total component cost of the switchgear equipment are reduced.

The foregoing discussion has indicated preferable ranges of the barrier height $A_1$ and the insulating distance B between the flexible conductor 106 and the side edges of the side opening 102e with reference to FIGS. 3 and 8. The following discussion will illustrate how those ranges have been obtained.

Explained at first is the barrier height $A_1$ together with the need for providing insulating barriers on actual switchgear systems.

Figure 9:
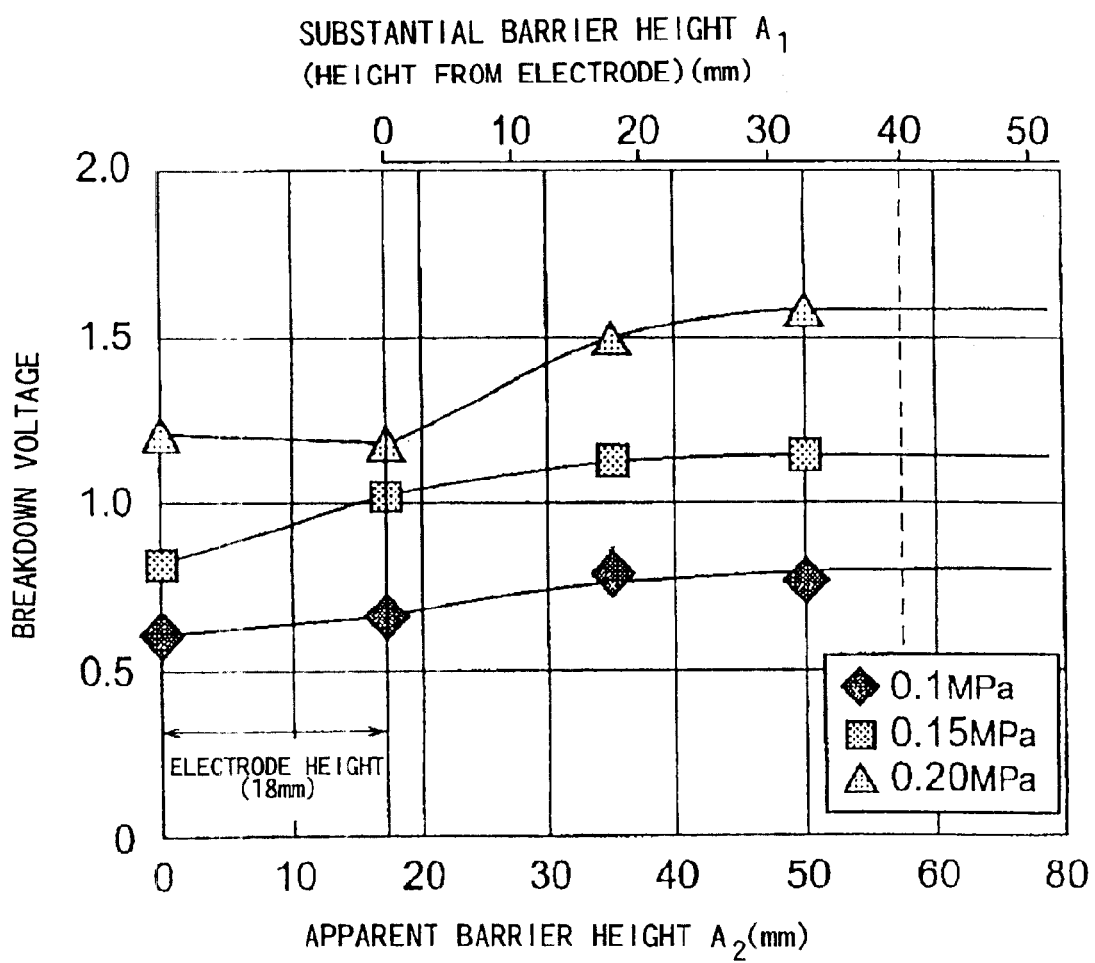
FIG. 9 is a diagram showing the relationship between the barrier height and breakdown voltage.
Figure 10:
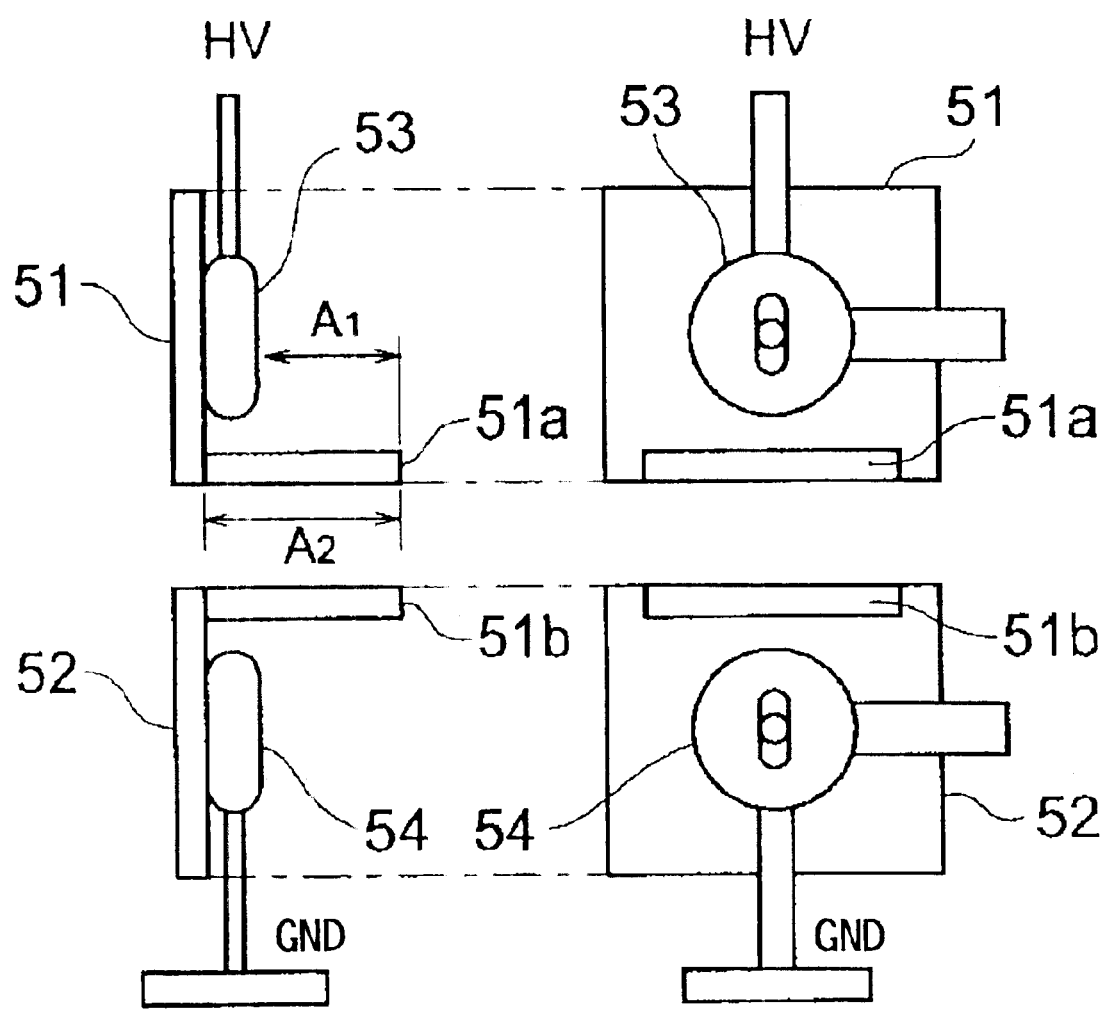
FIG. 10 is a diagram showing a simulated electrode system used in an experiment conducted to determine the relationship shown in FIG. 9.

The inventors carried out an experiment to determine the relationship between the barrier height and breakdown voltage using a simulated electrode system shown in FIG. 10. FIG. 9 is a diagram showing the result of the experiment. Referring to FIG. 10, the simulated electrode system has two mounting bases 51, 52 made of an insulating material. These mounting bases 51, 52 are positioned side by side. There are erected a pair of insulating barriers 51a, 51b at opposed end portions of the mounting bases 51, 52, respectively. The two insulating barriers 51, 51b face parallel to each other. A high-voltage electrode 53 is mounted on the mounting base 51 whereas a grounding electrode 54 is mounted on the mounting base 52 as illustrated. The simulated electrode system was placed in a sealed enclosure and the breakdown voltage was measured while varying the substantial barrier height $A_1$ (the height of the high-voltage electrode 53 from a principal surface) and the apparent barrier height $A_2$. The sealed enclosure was filled with pressurized air or dehydrated air at a pressure of 0.1 to 0.2 MPa (absolute pressure).

In this experiment, the high-voltage electrode 53 corresponds to one intermediate conductor 104 while the grounding electrode 54 corresponds to the adjacent intermediate conductor 104. Also, the insulating barriers 51a, 51b correspond to the horizontal-direction barrier portions $102d_1$ of two adjacent cylindrical insulator housings 102. A gap between the high-voltage electrode 53 and the grounding electrode 54, hereinafter referred to as the simulated gap, simulates a gap between a high-voltage conductor and a grounding conductor which are separated by the surface of an insulator, an insulating barrier, insulating gas, another insulating barrier and the surface of an another insulator.

Effects of the provision of the insulating barriers 51a, 51b of FIG. 10 are explained below. Referring to FIG. 9, the breakdown voltage increases under any gas pressure tested as the insulating barriers 51a, 51b are erected progressively higher than the test electrodes 53, 54, or when the substantial barrier height $A_1$ is made larger than 0 mm ($A_1>0$ mm). It is recognized from FIG. 9 that the breakdown voltage at $A_1=0$ mm is noticeably higher than that at $A_2=0$ mm at a gas pressure of 0.15 MPa, but this increase in the breakdown voltage does not occur at other gas pressures. The experimental result indicates that even when the height of the insulating barriers 51a, 51b is smaller than the height of the test electrodes 53, 54, the breakdown voltage increases at some gas pressure, but a significant increase in the breakdown voltage might not occur at all gas pressures. Thus, it is possible to increase the breakdown voltage between the intermediate conductors 104 and the walls of the sealed enclosure 101 (ground level), between the intermediate conductors 104 of the individual phases, and between the intermediate conductors 104 and the respective closed-side fixtures 105b in a reliable fashion by making the substantial barrier height $A_1$ larger than 0 mm. This is the reason why the substantial barrier height $A_1$ should preferably be larger than 0 mm ($A_1$>0 mm).

If the insulating barriers 51a, 51b are not provided in the simulated gap, that is, the high-voltage conductor and the grounding conductor are separated only by the surface of an insulator, insulating gas, and the surface of an another insulator, the breakdown voltage: between the two conductors generally becomes lower as compared to a case where no additional insulator is present. This is because if the insulator and the high-voltage conductor are arrange in direct contact with each other, a high electric field strength occurs at a surface portion of the high-voltage conductor in contact with the insulating gas extremely close to a contact point between the insulator and the high-voltage conductor and a discharge is apt to occur from that surface portion, as known as a widely accepted teaching.

Measures commonly taken to increase the breakdown voltage are to:

(1) Increase conductor-to-conductor distances;
(2) Insert a spacer between an insulator and a high-voltage conductor to ensure that curved portions of the high-voltage conductor do not go into contact with the insulator; and
(3) Increase the curvature of curved end portions of the high-voltage conductor.

All these measures are intended to reduce the electric field strength at portions where a discharge is likely to occur. Among them, the first measure, an increase in conductor-to-conductor distances, is rather undesirable because it directly results in an increase in equipment size. Also, the second and third measures might not be quite workable in certain cases due to limitations in the size of the spacer or in the curvature of the curved end portions of the high-voltage conductor. Even if there are no such limitations, the provision of the spacer, or an increase in the curvature of the curved end portions, alone might not be sufficient if dielectric withstand voltage to be achieved is extremely high.

Figure 12:
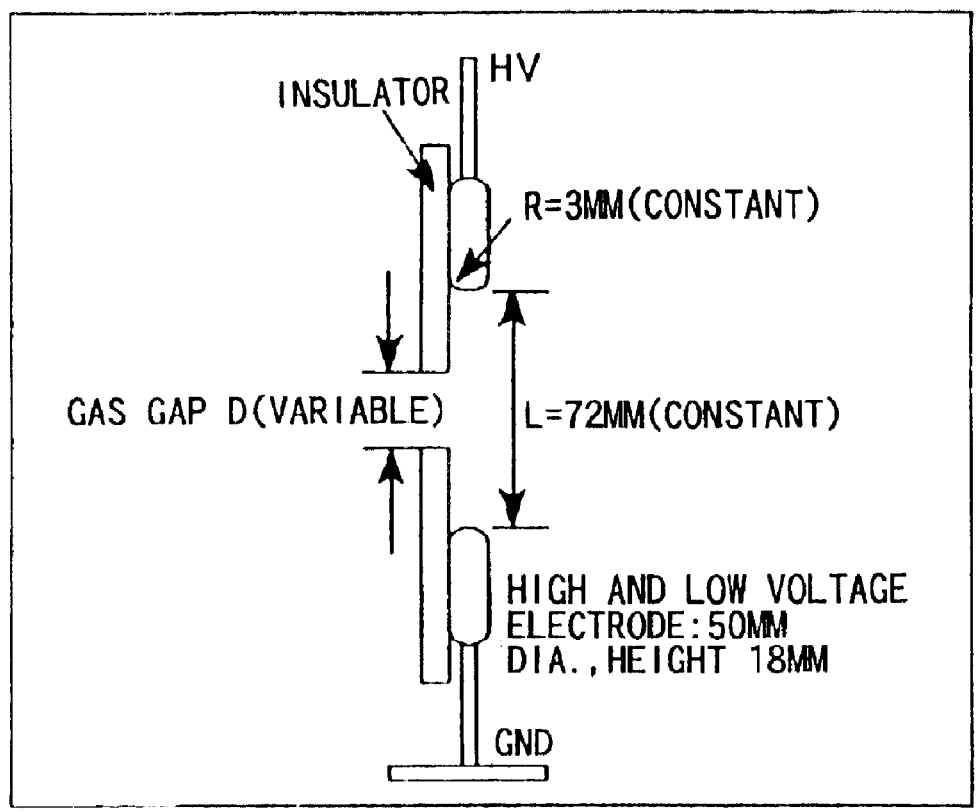
FIG. 12 is a diagram showing a simulated electrode system used in an experiment conducted to determine the relationship shown in FIG. 11.

Another measure for increasing the dielectric withstand voltage is to increase the extension of a gas-filled space in an insulation "gap." In an attempt to investigate the possibility of this measure, the inventors measured the breakdown, voltage while varying the extension of a gas-filled space (gas gap D) in an arrangement shown in FIG. 12. The arrangement of FIG. 12 is identical to that of FIG. 10 except that the insulating barriers 51a, 51b are removed from the simulated gap thereof.

Figure 11:
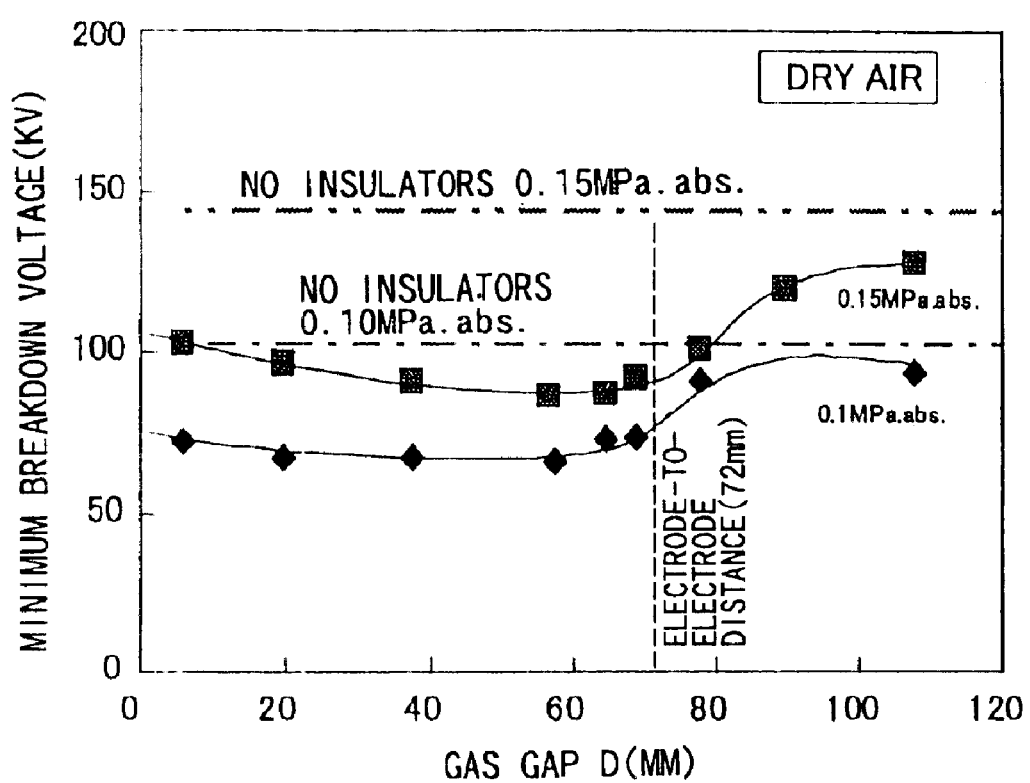
FIG. 11 is a diagram showing the relationship between the extension of a gas-filled space D and breakdown voltage.

FIG. 11 shows the result of testing performed by using dry air atmosphere. It can be seen from this Figure that the breakdown voltage does not increase when the gas gap (electrode-to-electrode distance) D is varied within a range of 0 to 72 mm (0<D<72 mm).

While insulators for mechanically fixing electrodes (which correspond to the intermediate conductors 104 and the bus bars 111) are needed in an actual switchgear system, it is not expected that the breakdown voltage could be increased even if the gas gap D is increased in the arrangement of FIG. 12 without the provision of insulating barriers. Therefore, the provision of the insulating barriers, like the insulating barriers 51a, 51b of FIG. 10, is so important for increasing the breakdown voltage besides the aforementioned measures (1) through (3).

Figure 13:
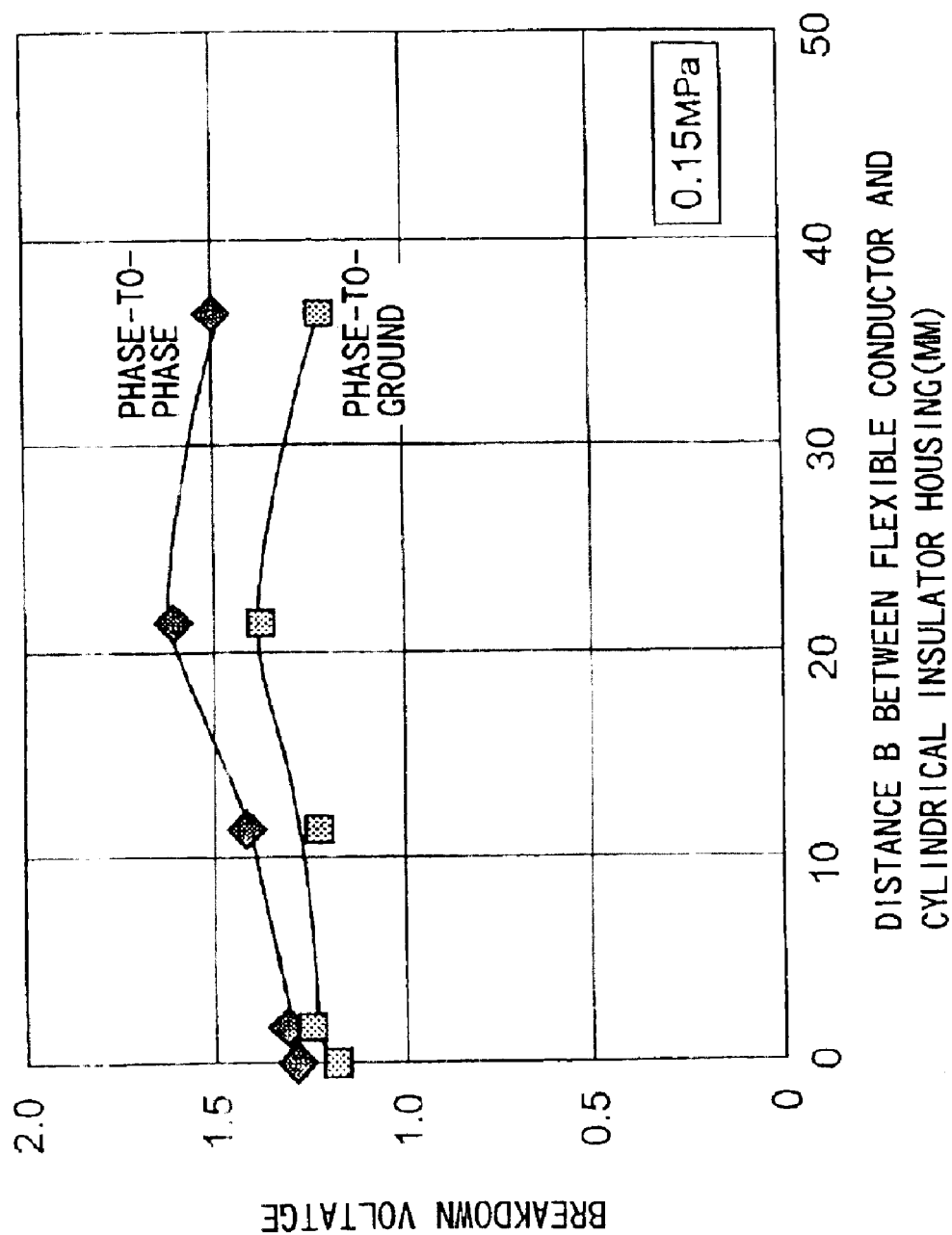
FIG. 13 is a diagram showing the relationship between the distance from a flexible conductor to the cylindrical insulator housing and breakdown voltage.
Figure 14:
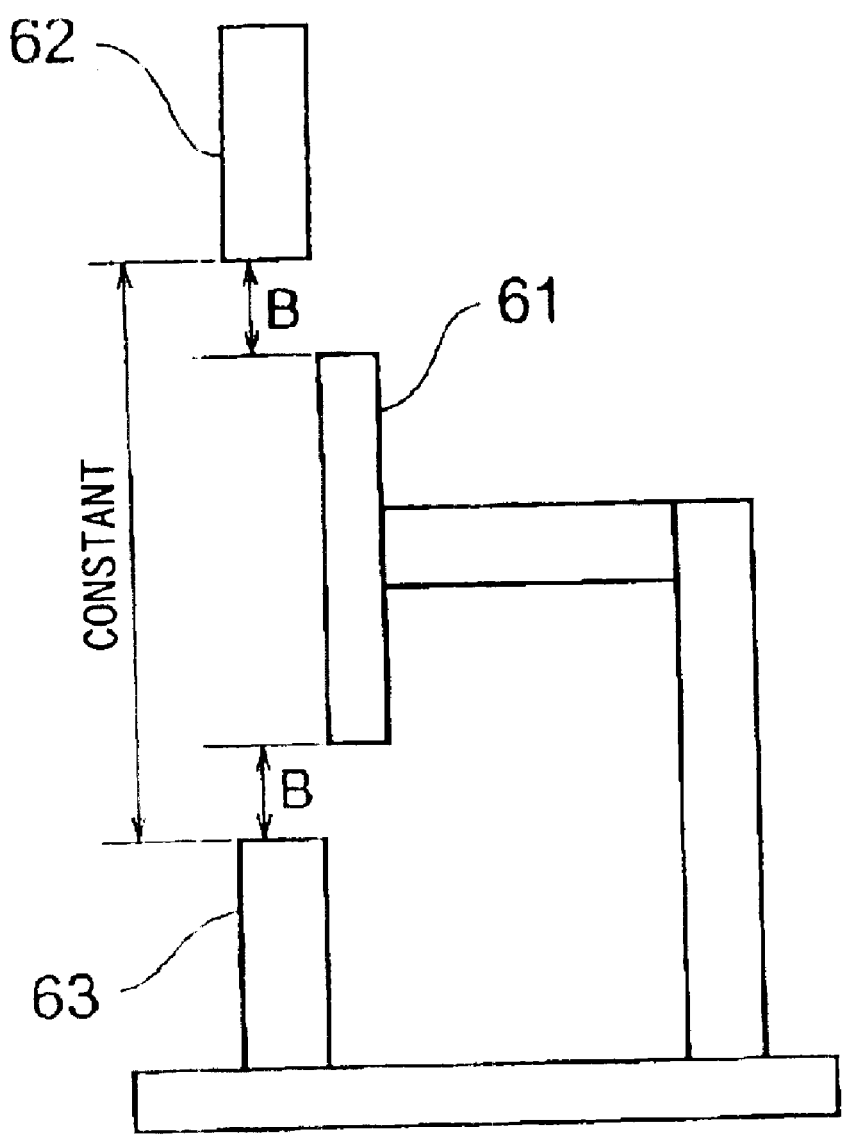
FIG. 14 is a diagram showing a simulated electrode system used in an experiment conducted to examine phase-to-phase breakdown voltage shown in FIG. 13.
Figure 15:
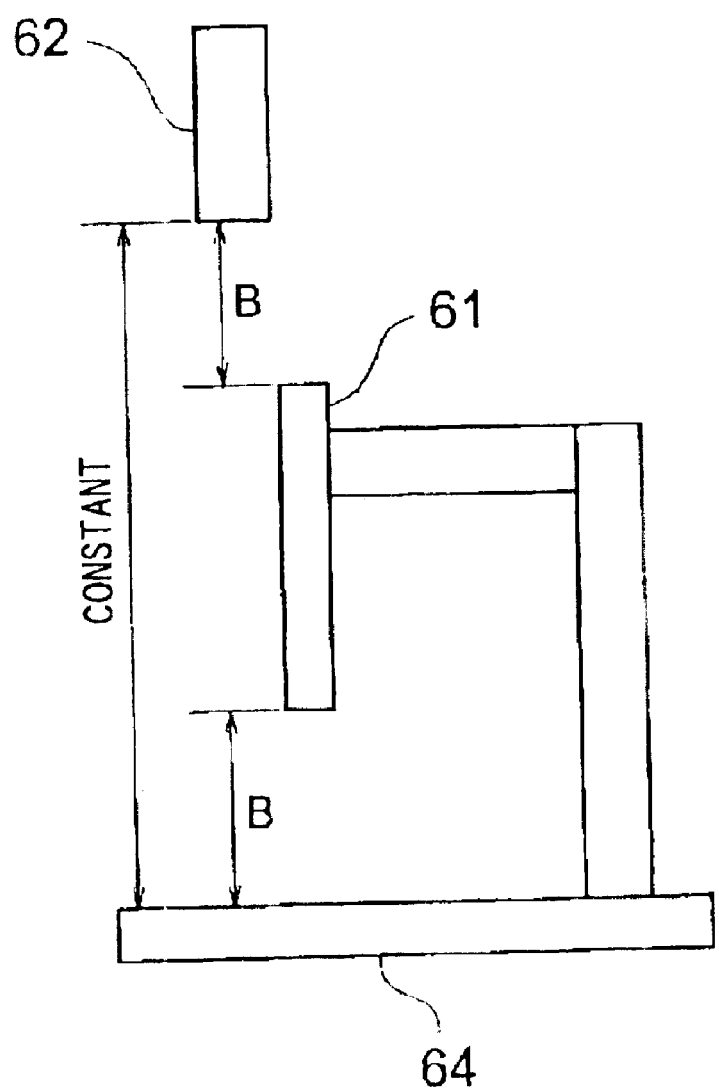
FIG. 15 is a diagram showing a simulated electrode system used in an experiment conducted to examine phase-to-ground breakdown voltage shown in FIG. 13.

Another important consideration in dimensional requirements is the distance B between the flexible conductor 106 and the side edges of the side opening 102e in the cylindrical insulator housing 102. The inventors conducted experiments to examine an effect of the distance B using simulated electrode systems shown in FIGS. 14 and 15 which were placed in sealed enclosures. FIG. 13 is a diagram showing the results of the experiments. The simulated electrode system of FIG. 14 was used when examining the breakdown voltage between phases (hereinafter referred to as the phase-to-phase breakdown voltage), and the simulated electrode system of FIG. 15 was used when examining the breakdown voltage between the individual phases and ground level (hereinafter referred to as the phase-to-ground breakdown voltage). In FIGS. 14 and 15, a high-voltage electrode 62 corresponds to one flexible conductor 106, a grounding electrode 63 (64) corresponds to the adjacent flexible conductor 106, and an intermediate insulator plate 61 provided between the high-voltage electrode 62 and the grounding electrode 63 (64) corresponds to a combination of two adjacent cylindrical insulator housings 102 and the space between them. The distance between the high-voltage electrode 62 and the grounding electrode 63 of FIG. 14 was fixed to 100 mm, whereas the distance between the high-voltage electrode 62 and the grounding electrode 64 of FIG. 15 was fixed to 110 mm. In this connection, the inventors have ascertained from other experiments that no difference in breakdown voltage is observed between a case where a single conductor (i.e., the intermediate insulator plate 61) is disposed as in the simulated electrode systems of FIGS. 14 and 15 and a case where two conductors are disposed in a manner similar to an actual switchgear system simulating the two adjacent cylindrical insulator housings 102 and the space between them. The sealed enclosure was filled with pressurized air or dehydrated air at a pressure of 0.15 MPa (absolute pressure).

It can be seen from FIG. 13 that when the distance B is varied within a specific range, the breakdown voltage reaches a peak point within this range. Specifically, a maximum breakdown voltage is obtained at approximately B=23 mm. Compared to the case where B=0 mm, the phase-to-ground breakdown voltage evidently increases when the distance B is between 15 mm and 30 mm. While the phase-to-phase breakdown voltage increases in a wider range than the phase-to-ground breakdown voltage, the range of the distance B in which both the phase-to-phase and the phase-to-ground breakdown voltages increase is approximately 15 to 30 mm. It is recognized from the foregoing that the distance B should preferably be set between 15 mm and 30 mm for effectively increase the breakdown voltages between the intermediate conductors 104 and the walls of the sealed enclosure 101 (ground level), and between the intermediate conductors 104 of different phases. It is more preferable to set the distance B at 23 mm since the breakdown voltages can be maximized at this distance.

As previously mentioned, it is desirable to fill the sealed enclosure 101 with one of the following insulating gases at a pressure higher than the atmospheric pressure:

(1) Dehydrated air
(2) Nitrogen
(3) Mixture of nitrogen and oxygen
(4) Mixture of nitrogen, oxygen and air
(5) Sulfur hexafluoride
(6) Mixture of sulfur hexafluoride and nitrogen
(7) Mixture of sulfur hexafluoride and air
(8) Mixture of sulfur hexafluoride and dehydrated air The aforementioned effects of insulating barriers in these gases have already been verified, so that the breakdown voltage is expected to increase with the provision of the insulating barriers according to the present embodiment.

As so far discussed, each cylindrical insulator housing 102 is provided with the first insulating barrier 102d covering at least part of the periphery of the intermediate conductor 104 in this embodiment, and the substantial barrier height $A_1$ is preferably made larger than 0 mm ($A_1>0$ mm). On the other hand, the distance B between the flexible conductor 106 and the side edges of the side opening 102e of each cylindrical insulator housing 102 is preferably set between 15 mm and 30 mm, more preferably made equal to 23 mm. The aforementioned features of the second embodiment make it possible to reduce the overall size of the switchgear equipment. Also, the embodiment makes it possible to provide a metal-enclosed switchgear manufactured at reduced assembly and component costs.

Third Embodiment

Figure 16:
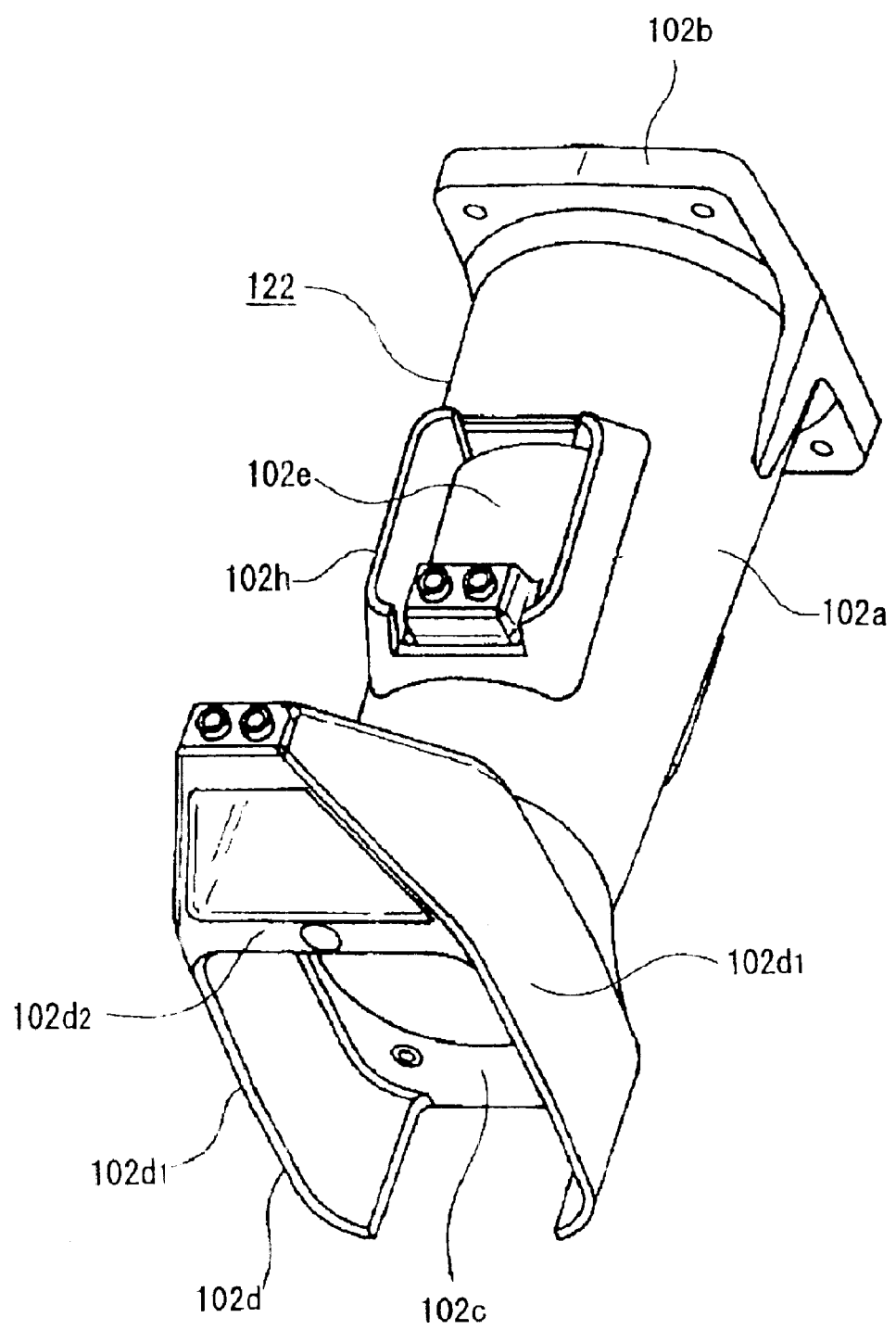
FIG. 16 is a perspective view of a generally cylindrical insulator housing used in a metal-enclosed switchgear according to a third embodiment of the invention.
Figure 17:
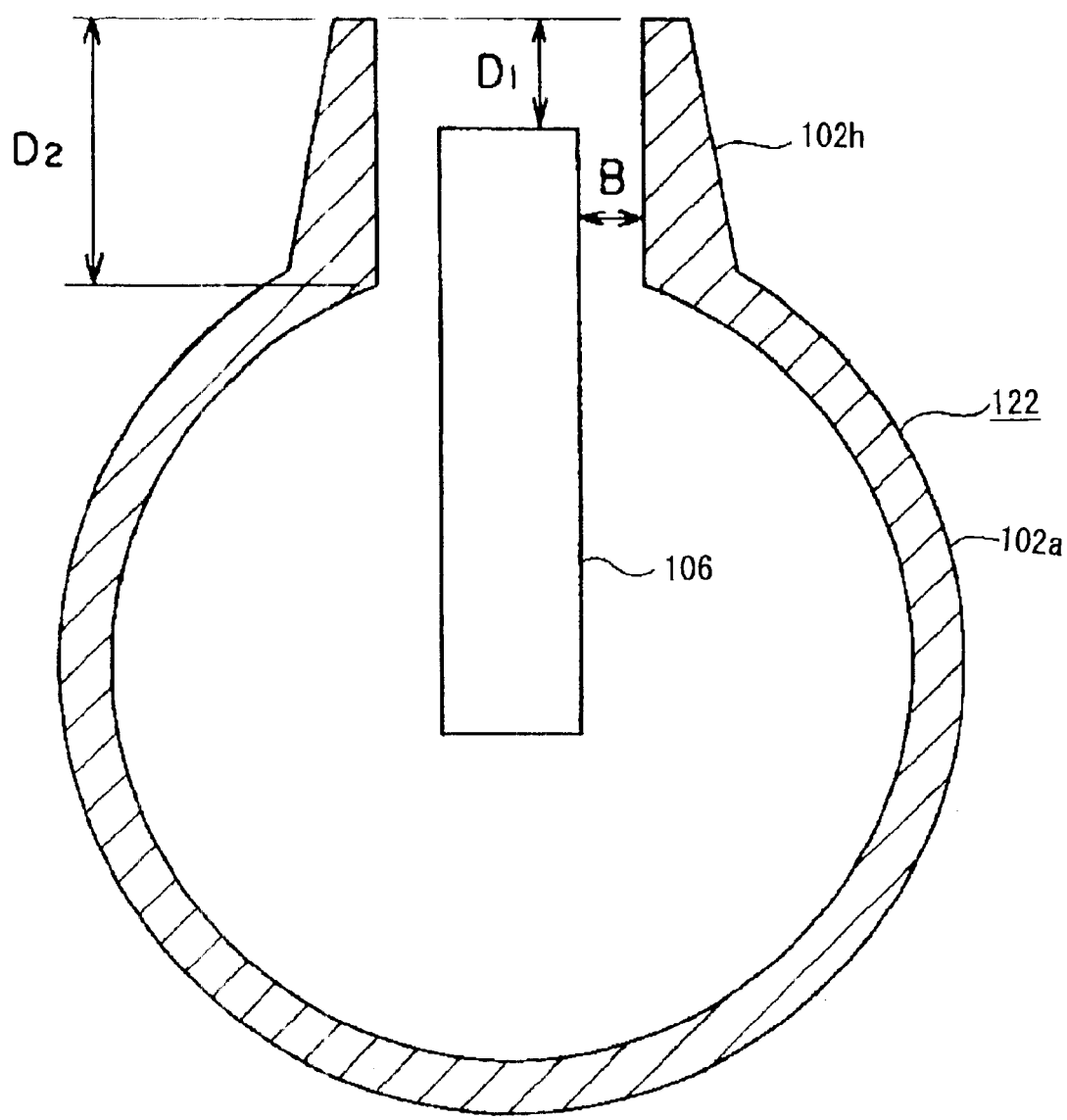
FIG. 17 is a cross section of the cylindrical insulator housing of FIG. 16 showing its side opening and a flexible conductor.

FIG. 16 is a perspective view of a one of generally cylindrical insulator housings 122 used in a metal-enclosed switchgear according to a third embodiment of the invention, and FIG. 17 is a cross section of the cylindrical insulator housing 122 of FIG. 16 particularly showing its side opening 102e and a flexible conductor 106. In this embodiment, each cylindrical insulator housing 122 has a cylindrical portion 102a and a second insulating barrier 102h one-piece formed with the cylindrical portion 102a along edges of the side opening 102e to cover at least part of the periphery of the flexible conductor 106. Although not illustrated in FIG. 16, a disconnector 105 of the same structure as that of FIG. 3 is provided at the same location. The metal-enclosed switchgear of this embodiment has otherwise the same construction as that of the second embodiments.

As shown in FIG. 17, the second insulating barrier 102h has a height $D_2$ as viewed along the longitudinal axis of the cylindrical insulator housing 122. Expressing the difference in the heights of the second insulating barrier 102h and the flexible conductor 106 as $D_1$ (hereinafter referred to as the substantial barrier height $D_1$), it is preferable that $D_1$ be larger than 0 mm ($D_1>0$ mm) Although an upper end of the flexible conductor 106 joins to a conductor connected to a fulcrum portion 105a, this conductor is not shown in FIG. 17 to simplify the drawing. The cross section of the conductor is so small that the conductor located higher than the upper end of the flexible conductor 106 need not be taken into account when examining the structure of the second insulating barrier 102h.

The shortest distance B between the flexible conductor 106 and side edges of the second insulating barrier 102h should preferably be in the range of 15 to 30 mm, more preferably 23 mm, in this embodiment too.

Benefits of the aforementioned construction of the third embodiment are now described, in which the same benefits as already mentioned with reference to the second embodiment are not repeated here.

First, the construction of the third embodiment is advantageous in that the provision of the second insulating barrier 102h serves to further reduce the overall dimensions of switchgear equipment. When three cylindrical insulator housings 122 are installed side by side, the second insulating barriers 102h formed along the edges of their side openings 102e separate live parts of the three phases. Specifically, the second insulating barriers 102h increase the insulation breakdown voltages between phases (i.e., between the flexible conductors 106 of the adjacent phases) and between the individual phases and ground level (i.e., between the flexible conductors 106 and walls of the sealed enclosure 101).

Here, it is preferable that the substantial barrier height $D_1$ of the second insulating barriers 102h shown in FIG. 17 be larger than 0 mm ($D_1>0$ mm) as previously discussed with reference to FIG. 9. Also, the distance B between the flexible conductor 106 and the side edges of the second insulating barrier 102h should preferably be in the range of 15 to 30 mm, more preferably 23 mm as previously discussed with reference to FIG. 13. If the distance B is optimized upon determining the substantial barrier height $D_1$ as stated above, their synergistic effect will significantly increase both the phase-to-phase and the phase-to-ground breakdown voltages, making it possible to reduce insulating distances between live parts by an amount corresponding to the increase in the breakdown voltages.

Although the provision of the second insulating barriers 102h causes some dimensional increase in their projecting direction, they serve to reduce the dimensions of each cylindrical insulator housing 122 as a whole, producing a sufficient effect that the overall dimensions of the switchgear can be reduced.

Second, because the second insulating barrier 102h is one-piece formed with the cylindrical portion 102a of each cylindrical insulator housing 122, rather than separately from the cylindrical portion 102a, the dimensions of the switchgear equipment can be efficiently reduced. If a separate insulating barrier is provided instead of the second insulating barrier 102h, there will arise the need for an additional space around the cylindrical insulator housing 122 for supporting the insulating barrier, and this will lessen the effect of reducing the dimensions of the switchgear equipment. The provision of the second insulating barrier 102h one-piece formed with the cylindrical portion 102a of the cylindrical insulator housing 122 serves to simplify the internal structure of the switchgear, thereby producing an increased effect of reducing its dimensions.

Concerning the insulating gas to be filled in the sealed enclosure 101, the aforementioned effects of insulating barriers in the same kinds of gases as mentioned in the second embodiment have already been verified, so that the breakdown voltage is expected to increase with the provision of the insulating barriers according to the present embodiment.

As so far discussed, each cylindrical insulator housing 122 is provided with the second insulating barrier 102h covering at least part of the periphery of the flexible conductor 106 in this embodiment, and the substantial barrier height $D_1$ is preferably made larger than 0 mm ($D_1>0$ mm). On the other hand, the distance B between the flexible conductor 106 and the side edges of the side opening 102e of each cylindrical insulator housing 122 is preferably set between 15 mm and 30 mm, more preferably made equal to 23 mm. The aforementioned features of the second embodiment make it possible to reduce the overall size of the switchgear equipment. Also, the embodiment makes it possible to provide a metal-enclosed switchgear manufactured at reduced assembly and component costs.

Fourth Embodiment

Figure 18:
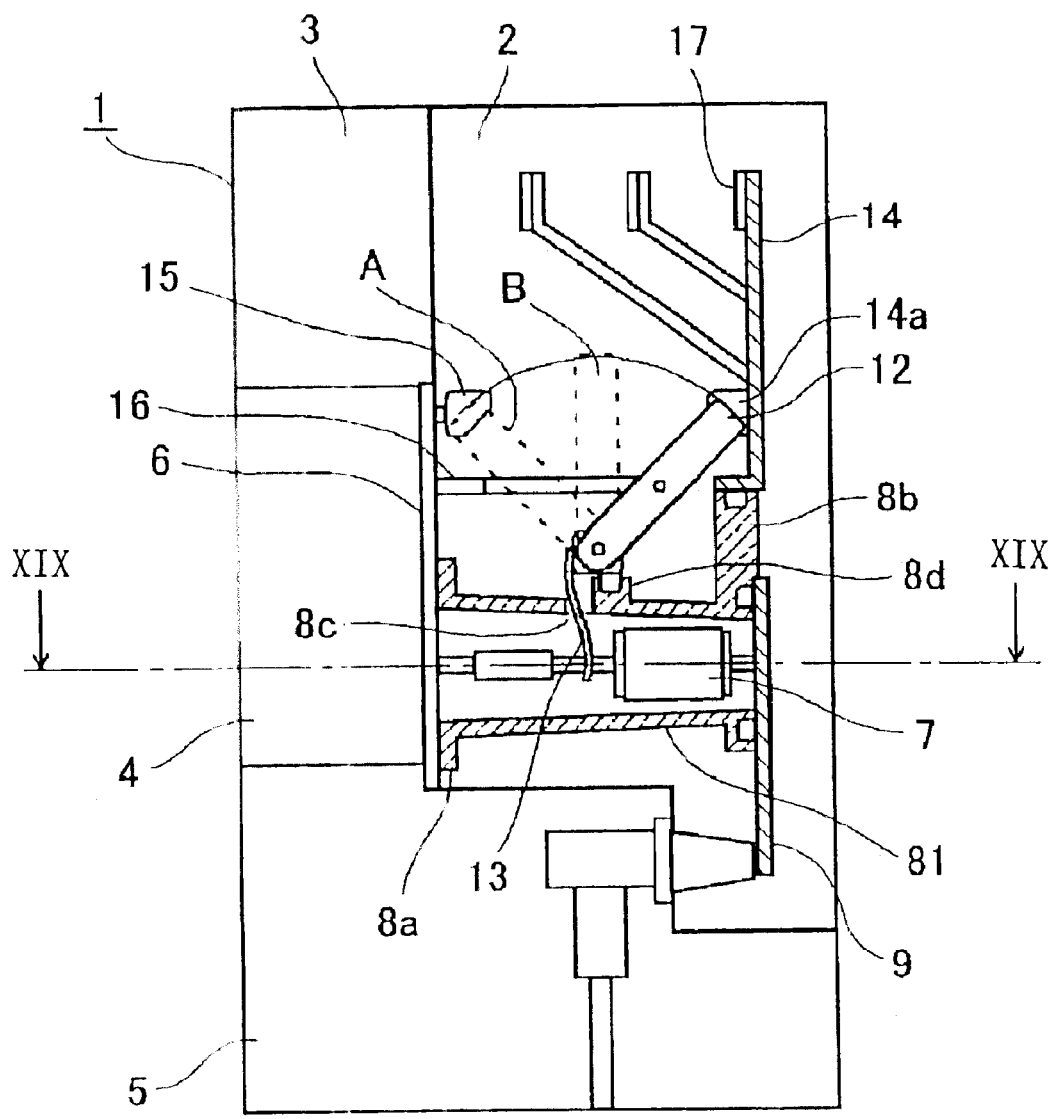
FIG. 18 is a schematic sectional side view of a metal-enclosed switchgear according to a fourth embodiment of the invention.
Figure 19:
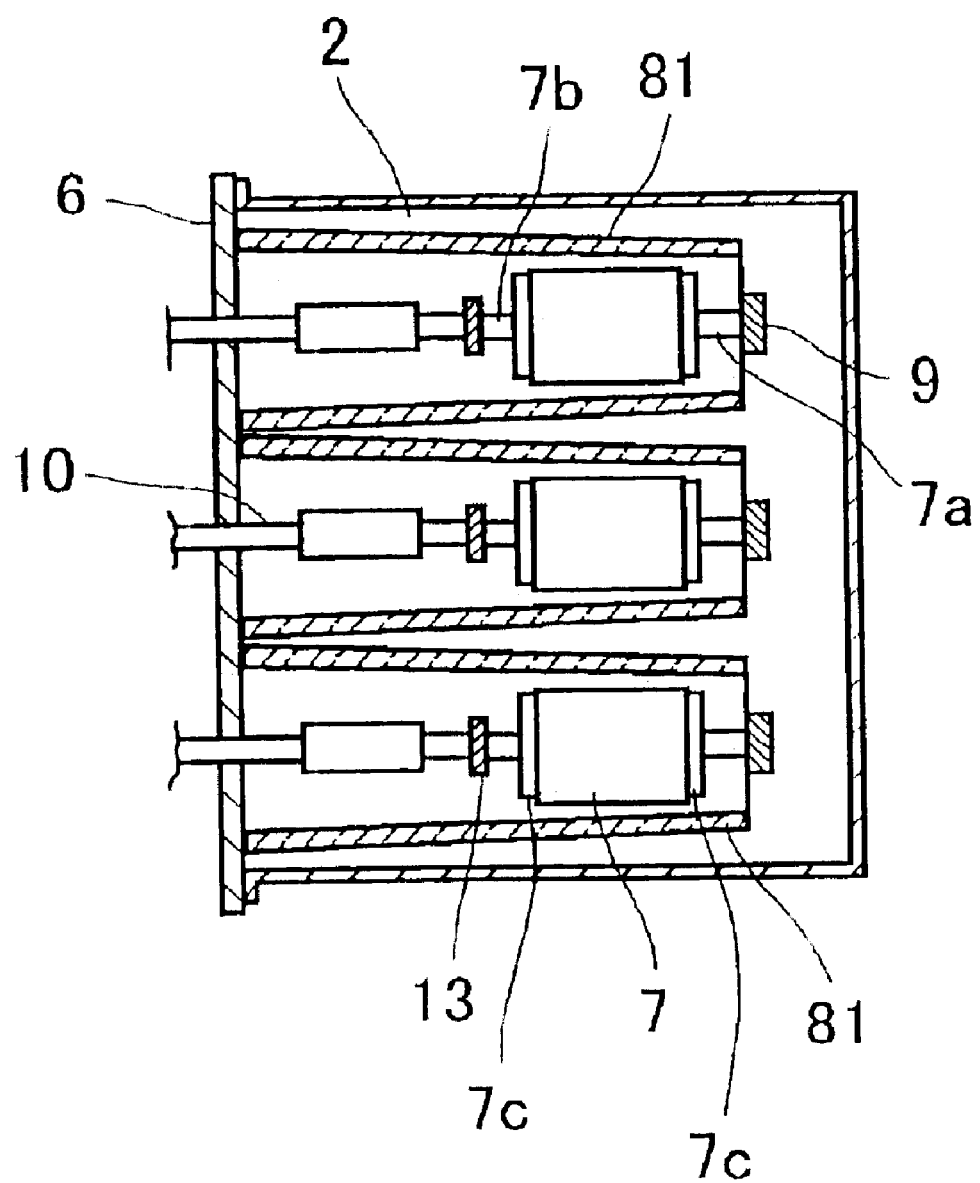
FIG. 19 is a sectional diagram showing principal parts of the metal-enclosed switchgear taken along lines XIX—XIX of FIG. 18.

FIG. 18 is a schematic sectional side view of a metal-enclosed switchgear according to a fourth embodiment of the invention showing principal components provided in its tank 2, and FIG. 19 is a sectional diagram showing principal parts of the metal-enclosed switchgear taken along lines XIX—XIX of FIG. 18, in which elements identical or similar to those of the foregoing embodiments are designated by the same reference numerals. In the fourth embodiment, each of three insulator tubes 81 is formed into a truncated cone shape, the inside diameter of the insulator tube 81 gradually decreasing from its front-side mounting portion 8a (left side as illustrated) fixed to an inner wall of the tank 2 toward a rear-end portion (right side as illustrated). Although not specifically described here, the metal-enclosed switchgear of this embodiment has otherwise the same construction as that of the first embodiment.

The insulator tubes 81 is produced by cast molding thermosetting resin, such as epoxy resin, in a metal die. Epoxy resin is produced by mixing a chief material with a curing agent and heating this mixture to a specific temperature or above. Epoxy resin slightly shrinks during curing. When molding epoxy resin, the metal die is heated to 100° C. or above for instance, to increase fluidity of the mixture and accelerate curing reaction. Epoxy resin shrinks by the time when the molded product is removed from the metal die due to a slight temperature drop.

Due to cure shrinkage during the molding process and heat shrinkage occurring as a result of the temperature drop, stress occurs on surfaces of the metal die in directions in which the metal die passes through the insulator tube 81. Although it would be difficult to remove the finished insulator tube 81 from the metal die if the insulator tube 81 had a uniform inside diameter along its length, the insulator tube 81 of this embodiment can be easily removed from the metal die, because the insulator tube 81 has a tapered inner wall with its inside diameter gradually decreasing from one end to the other.

As so far described, the inner wall of the insulator tube 81 is tapered in such a manner that the inside diameter of the insulator tube 81 gradually decreases from its front-side mounting portion 8a toward the rear-end portion as shown in FIG. 19 in the fourth embodiment. In this construction, the insulator tube 81 can be drawn out of the metal die in a direction of its large-diameter side at the end of the molding process, so that the insulator tube 81 can be easily removed from the metal die even when cure shrinkage or heat shrinkage of the solid insulating material (epoxy resin) occurs during the molding process. This serves to improve manufacturing efficiency and reduce manufacturing cost. Another advantage of this embodiment is an improvement in the mechanical strength of the insulator tube 81 as it is installed due to an increase in the diameter of its mounting portion 8a.

Figure 20:
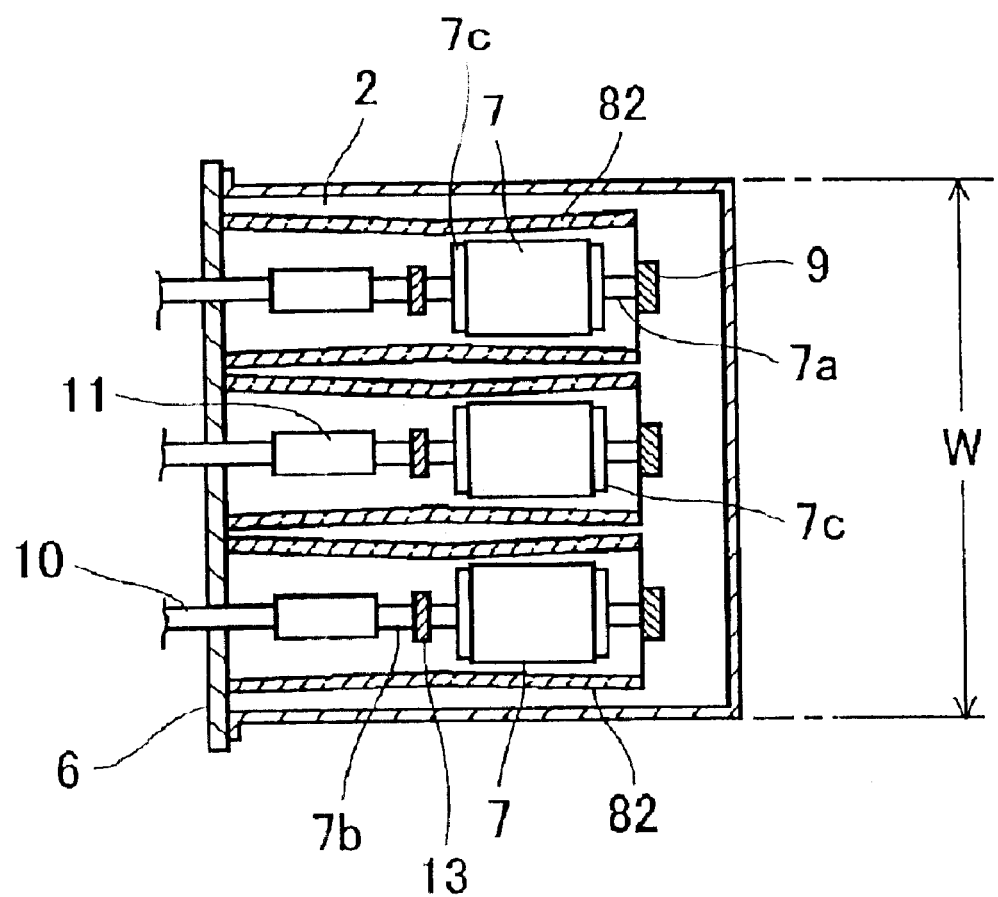
FIG. 20 is a sectional diagram showing principal parts of a metal-enclosed switchgear intone variation of the fourth embodiment of the invention.

Shown in FIG. 20 is a variation of the fourth embodiment, in which the inside diameter of each insulator tube 82 is the smallest at the middle of its length gradually increasing toward both ends along its axial direction. A metal die used for producing the insulator tube 82 of this variation should be made splittable into two sections by a plane along its longitudinal axis.

A metal-enclosed switchgear of this variation is provided with insulator tubes 82 for three phases which are arranged side by side in a horizontal plane in a metallic tank 2, each insulator tube 82 containing a vacuum-valve breaker 7. In this metal-enclosed switchgear, the highest electric field strengths occur at portions of end plates 7c of the vacuum-valve breakers 7 facing the inner wall surface of the tank 2 and at portions where the end plates 7c of the adjacent vacuum-valve breakers 7 face each other. Each insulator tube 82 works as an insulating barrier for avoiding insulation breakdown occurring from a region of concentrated electric fields on a surface of the end plate 7c. However, local field strengths on the surface of the end plate 7c increase as the inner wall surface of insulator tube 82 becomes closer to the end plate 7c of the vacuum-valve breaker 7 and therefore, it is necessary to provide at least a specific gap between the inner wall surface of the insulator tube 82 and the end plate 7c of the vacuum-valve breaker 7.

According to the fourth embodiment shown in FIGS. 18 and 19, the insulator tube 81 has the minimum inside diameter at its rear-end portion (right side as illustrated) so that the stationary electrode side of the vacuum-valve breaker 7 is closest to the inner wall surface of the insulator tube 81. Since the inside diameter of the insulator tube 81 increases toward its front-side mounting portion 8a (left side as illustrated), the radial dimension of the insulator tube 81 is determined by the minimum inside diameter at its rear-end portion, the angle of inclination of the inner wall surface and the length of the insulator tube 81.

On the other hand, the insulator tube 82 of FIG. 20 has the minimum inside diameter at the middle of its length, the inside diameter of the insulator tube 82 increasing toward its both ends, so that the movable electrode side of the vacuum-valve breaker 7 is closest to the inner wall surface of the insulator tube 82. Therefore, the radial dimension of the insulator tube 82 is determined by the minimum inside diameter at the middle of its length, the angle of inclination of the inner wall surface and one half of the length of the insulator tube 82.

It is understood from the foregoing that the radial dimension can be reduced according to the shape of the insulator tube 82 shown in FIG. 20 and the construction of the metal-enclosed switchgear, in which the insulator tubes 82 for three phases are horizontally arranged side by side in the tank 2, makes it possible to reduce the width W of the tank 2.

While supporting the individual vacuum-valve breakers 7, the insulator tubes 82 work as insulating barriers for increasing the insulation resistance between the adjacent vacuum-valve breakers 7 and between each vacuum-valve breaker 7 and the inner wall surface of the tank 2. If the insulator tube 82 is located too close to the vacuum-valve breaker 7, however, the insulation resistance decreases due to an increase in local field strength. Thus, there are design limitations in reducing the inside diameter of an insulator tube. In addition, if the insulator tube is tapered to produce an inclined inner wall surface, the insulator tube will have an enlarged maximum diameter, making it difficult to reduce the overall size of the metal-enclosed switchgear. Under these circumstances, the minimum inside diameter of the insulator tube 82 is located approximately at the middle of its length in order to produce an inclined inner wall surface and achieve a reduction in the size of the switchgear.

Fifth Embodiment

Figure 21:
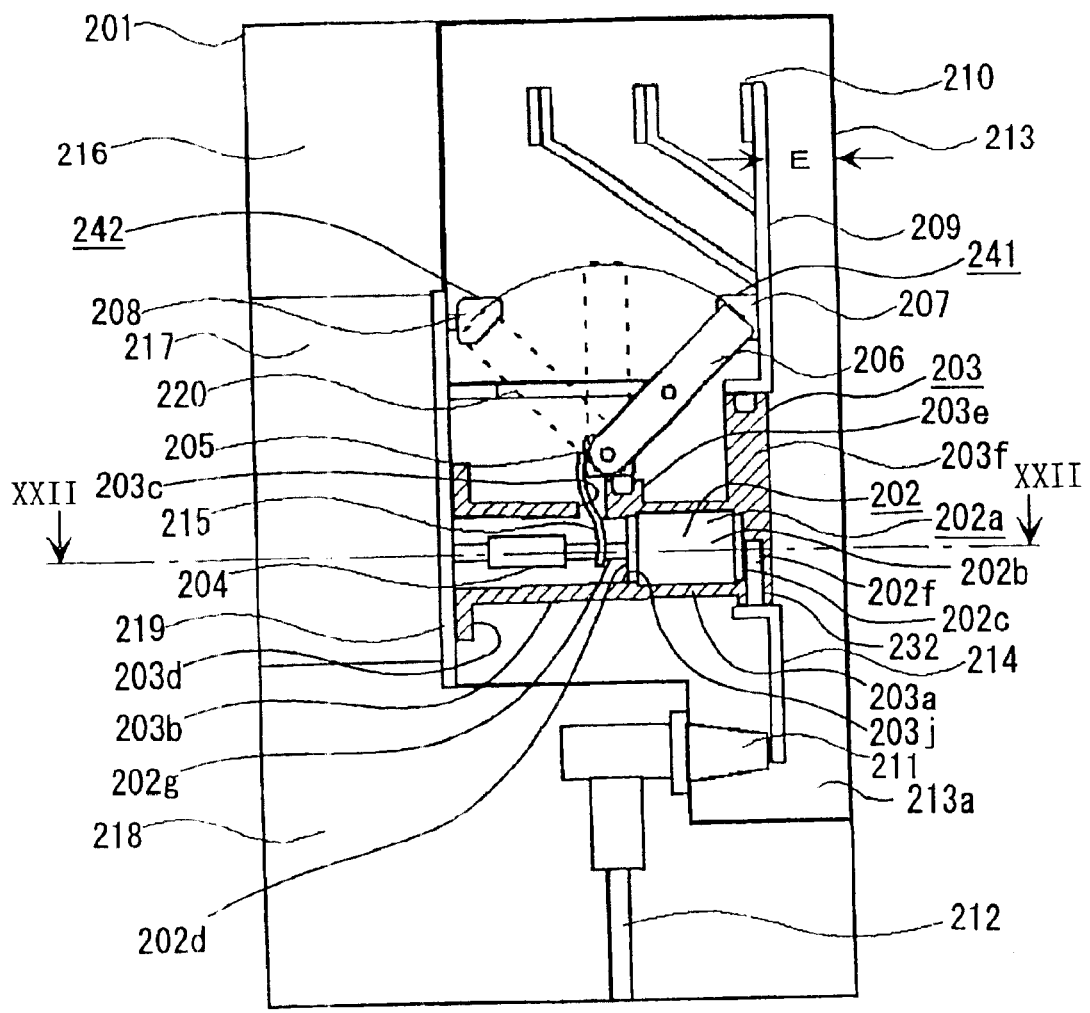
FIG. 21 is a schematic sectional side view of a metal-enclosed switchgear according to a fifth embodiment of the invention.
Figure 22:
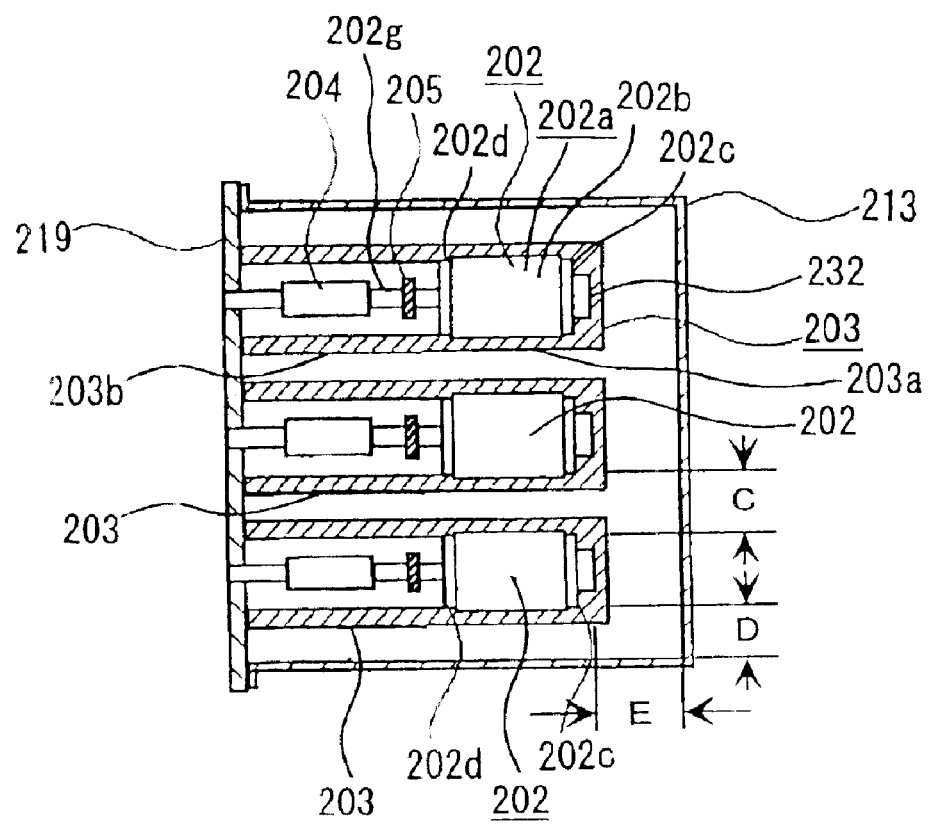
FIG. 22 is a sectional diagram showing principal parts of the metal-enclosed switchgear taken along lines XXII—XXII of FIG. 21.

FIG. 21 is a schematic sectional side view of a metal-enclosed switchgear 201 according to a fifth embodiment of the invention, and FIG. 22 is a sectional diagram showing principal parts of the metal-enclosed switchgear 201 taken along lines XXII—XXII of FIG. 21. Referring to these Figures, a tank (metallic enclosure) 213 is square-shaped in horizontal cross section (refer to FIG. 22) and has a bushing compartment 213a extending downward from a rear bottom portion (lower right as illustrated in FIG. 21). There is installed a bushing 211 in the bushing compartment 213a in a hermetically sealed fashion. A mounting plate 219 is hermetically welded to the front side (left side as illustrated in FIG. 21) of the tank 213. The tank 213 is filled with an insulating gas, such as sulfur hexafluoride gas, nitrogen gas pressured air, or a mixture of these gases mixed at a specific ratio.

Having a control compartment 216 located at a left-hand upper front part, an actuator mechanism compartment 217 located on the front side (left side as illustrated in FIG. 21) of the mounting plate 219 to accommodate unillustrated vacuum-valve actuator mechanisms, and a cable compartment 218 located below the actuator mechanism compartment 217, the metal-enclosed switchgear 201 constitute a box like cubicle structure as a whole, the tank 213 forming part of the box like structure.

Each of three vacuum-valve breakers 202 includes a cylindrical vacuum vessel 202a, a stationary electrode rod 202f and a movable electrode rod 202g. The vacuum vessel 202a has a cylindrical portion 202b made of an insulating material, such as ceramics, and end plates 202c, 202d made of an conductive material hermetically brazed to both ends of the cylindrical portion 202b. The stationary electrode rod 202f passes through the end plate 202c in a hermetically sealed fashion, with a stationary contact (not shown) affixed to an extreme end of the stationary electrode rod 202f inside the vacuum vessel 202a.

The movable electrode rod 202g is movably fitted to the cylindrical portion 202b of the vacuum-valve breaker 202, hermetically passing through a bellows (not shown) affixed to the end plate 202d. A movable contact (not shown) is affixed to one end of the movable electrode rod 202g inside the vacuum vessel 202a. The other end of the movable electrode rod 202g is linked to the unillustrated vacuum-valve actuator mechanism via an insulator rod 204. With this arrangement, the vacuum-valve actuator mechanism of each vacuum-valve breaker 202 drives the movable electrode rod 202g left and right, causing the movable contact to go into contact with and be separated from the aforementioned stationary contact. The stationary electrode rod 202f fixed to the end plate 202c is connected to a load-side terminal strip 232.

Insulator supports 203 serving as insulator tubes support the vacuum-valve breakers 202 of the individual phases. Made of a solid insulating material, such as epoxy resin, each insulator support 203 includes as its integral parts a one-piece molding portion 203a, an extended support portion 203b, a through hole portion 203c, a mounting portion 203d, a disconnector support portion 203e and a bus-side conductor support portion 203f. The one-piece molding portion 203a serving as an insulator covering has an opening portion 203j. The movable electrode rod 202g of the vacuum-valve breaker 202 passes through the opening portion 203j, leaving a specific gap between the movable electrode rod 202g and the opening portion 203j. The one-piece molding portion 203a closely surrounds the cylindrical portion 202b of the vacuum vessel 202a, particularly the peripheries of the two end plates 202c, 202d, the stationary electrode rod 202f and the load-side terminal strip 232 where high electric field strengths occur, in such a manner that no gaps are created between them except at the opening portion 203j.

The extended support portion 203b is a hollow cylindrical structure extending from the opening portion 203j of the one-piece molding portion 203a along the moving direction (left-to-right dimension as illustrated in FIG. 21) of the movable electrode rod 202g of each vacuum-valve breaker 202. The extended support portion 203b serves to provide a proper distance for ensuring surface insulation between the vacuum-valve breaker 202 and the mounting plate 219 which is held at the ground potential. The through hole portion 203c is located at about the middle of the extended support portion 203b and the mounting portion 203d having a circular flange like shape is formed at an extreme end of the extended support portion 203b. The mounting portion 203d is fixed to the mounting plate 219 in such a manner that the moving direction of the movable electrode rod 202g of the vacuum-valve breaker 202 aligns with the horizontal direction as illustrated in FIG. 21.

The disconnector support portion 203e projects slightly upward as illustrated in FIG. 21 from about the boundary between the one-piece molding portion 203a and the mounting portion 203d. The bus-side conductor support portion 203f has a barlike structure having a rectangular cross section extending upward as illustrated in FIG. 21. The bus-side conductor support portion 203f serves to provide a proper distance for ensuring surface insulation between the load-side terminal strip 232 connected to the stationary electrode rod 202f of the vacuum-valve breaker 202 and a later-described bus-side conductor strip 209.

In the metal-enclosed switchgear 201 of this embodiment, the insulator supports 203 individually incorporating the vacuum-valve breakers 202 for three phases are arranged side by side across the tank 213 as so far discussed. The individual insulator supports 203 are fixed to the mounting plate 219 by bolts (not shown) in such a manner that the end plates 202c, 202d of the adjacent vacuum-valve breakers 202 are separated horizontally (vertically as illustrated in FIG. 22) by a specific distance C, leaving a specific distance D from the end plates 202c, 202d of the two outside vacuum-valve breakers 202 to inner side wall surfaces of the tank 213.

The distance C between the end plates 202c, 202d of the adjacent vacuum-valve breakers 202 and the distance D from the end plates 202c, 202d of the two outside vacuum-valve breakers 202 to the inner side wall surfaces of the tank 213 are made smaller than corresponding distances in the conventional metal-enclosed switchgear, so that the width of the metal-enclosed switchgear 201 as measured in a direction perpendicular to the plane of the page of FIG. 21 is reduced in this embodiment. Since the end plates 202c, 202d of the vacuum-valve breakers 202, and in particular their peripheries where concentrated electric fields occur, of three phases are surrounded by the one-piece molding portions 203a of the respective insulator supports 203, there is least risk of partial discharge and disruptive discharge between the adjacent vacuum-valve breakers 202.

The configuration of a disconnector 241 and a grounding switch 242 of each phase is now described.

Referring to FIG. 21, a blade base 205 serving as a blade support member is fixed to the disconnector support portion 203e of each insulator support 203. The blade base 205 is electrically connected to the movable electrode rod 202g of the vacuum-valve breaker 202 by a flexible conductor 215 which is passed through the through hole portion 203c of the insulator support 203. Each bus-side conductor strip 209 is fixedly supported by the pertinent bus-side conductor-support portion 203f. Each bus-side conductor strip. 209 is fitted with a bus line terminal 207 at a location slightly separated above from a part where the bus-side conductor strip 209 is supported by the bus-side conductor support portion 203f.

On the other hand, grounding terminals 208 are affixed to the mounting plate 219. Blades 206 for three phases are swingably supported by the respective blade bases 205. The vacuum-valve breaker 202 is in an ON (closed) state flowing an electric current when the pertinent blade 206 is turned to a clockwise position as shown by solid lines in FIG. 21 where its extreme end is in contact with the bus line terminal 207. The vacuum-valve breaker 202 is in a grounded state when the blade 206 is turned to a counterclockwise position as shown by broken lines in FIG. 21 where its extreme end is in contact with the grounding terminal 208.

Also, the vacuum-valve breaker 202 is in an OFF (open) state when the blade 206 is positioned as shown by broken lines at a middle position between the ON state and grounded state positions. The individual blades 206 are actuated by blade operating rods 220 from the actuator mechanism compartment 217 located on the front side of the tank 213. The blade base 205, the blade 206 and the bus line terminal 207 together constitute each disconnector 241, while the blade base 205, the blade 206 and the grounding terminal 208 together constitute each grounding switch 242.

The stationary electrode rod 202f of each vacuum-valve breaker 202 is connected to the pertinent bushing 211 via the load-side terminal strip 232 embedded in the insulator support 203 and a load-side conductor 214. An external cable 212 is connected to the bushing 211.

The load-side conductors 214 of three phases connected respectively to the bus-side conductor strips 209, bus bars 210 and the stationary electrode rods 202f of the vacuum-valve breakers 202 via the respective load-side terminal strips 232 are together accommodated in the tank 213 filled with the insulating gas. In this construction, the vacuum-valve breakers 202 for three phases are arranged side by side in such a manner that their end plates 202c, 202d are separated horizontally (vertically as illustrated in FIG. 22) by the specific distance C, leaving the specific distance D from the end plates 202c, 202d of the two outside vacuum-valve breakers 202 to the inner side wall surfaces of the tank 213 as previously mentioned.

With the provision of the aforementioned insulator supports 203, the distance D shown in FIG. 22 can be made smaller than a distance E between a rear surface of each bus-side conductor strip 209 and an inner rear wall surface of the tank 213 shown in FIGS. 21 and 22. This makes it possible to satisfy the need for reducing the width of metal-enclosed switchgears.

In the metal-enclosed switchgear 201 thus constructed, the highest electric field strengths occur between the end plates 202c, 202d of the adjacent vacuum-valve breakers 202, and between the inner side wall surfaces of the tank 213 and edges of the end plates 202c, 202d of the two outside vacuum-valve breakers 202. In a conventional metal-enclosed switchgear of a similar construction in which vacuum-valve breakers are housed in insulator tubes fixed in a tank there exist gaps between the vacuum-valve breakers and the insulator tubes. Therefore, partial discharge and/or disruptive discharge is likely to occur from end plates of the vacuum-valve breakers where high electric fields occur particularly when the metal-enclosed switchgear is reduced in size.

In the metal-enclosed switchgear of the present embodiment in which each vacuum-valve breaker 202 is molded in the one-piece molding portion 203a of the insulator support 203, however, the peripheries of the end plates 202c, 202d constituting edges of each vacuum vessel 202a where concentrated electric fields occur are surrounded by the insulator support 203 which is made of the solid insulating material having much better insulating properties than gas. For this reason, the surface discharge voltage along insulator surfaces and the corona discharge starting voltage at the stationary electrode rods 202f are increased in the construction of this embodiment. The dimensions of the insulator supports (solid insulating material) 203 can be reduced by an amount corresponding to the increase in the discharge voltages, making it possible to achieve insulating performance of higher reliability even when the physical size of the metal-enclosed switchgear is reduced. The metal-enclosed switchgear can be made still more compact due to the aforementioned construction of the embodiment, in which the disconnector 241 and the grounding switch 242 are compactly assembled with the vacuum-valve breaker 202 together forming a modular unit.

What is claimed is:

1. A metal-enclosed switchgear comprising:
   a vacuum-valve breaker;
   an insulator tube;
   a disconnector;
   a movable electrode rod;
   a stationary electrode rod;
   a bus-side conductor; and
   a metallic enclosure accommodating said vacuum-valve breaker, said insulator tube, and said disconnector, wherein
   said insulator tube is fixed at a first end, in an axial direction, to said metallic enclosure, said insulator tube having, near a second end, in the axial direction, a bus line fixing portion for supporting said bus-side conductor in an insulated fashion,
   said vacuum-valve breaker is fixed inside said insulator tube, said vacuum-valve breaker having at first and second ends in the axial direction, said movable electrode rod and said stationary electrode rod, respectively, and
   said disconnector includes:
      a blade support member electrically connected to said movable electrode rod by a connecting conductor and fixed to a peripheral part of said insulator tube;
      a bus line terminal fixed and connected to said bus-side conductor; and
      a blade swingably attached to said blade support member at a first end such that a second end of said blade can be brought into contact with and separated from said bus line terminal, whereby said blade is part of a disconnecting device.

2. The metal-enclosed switchgear according to claim 1 further comprising a grounding terminal provided at a position of said metallic enclosure such that the swingable end of said blade can be brought into contact with and separated from said grounding terminal, said blade working as a three-point disconnecting device which establishes an ON state when the swingable end of said blade is contact with said bus line terminal, a grounded state when the swingable end of said blade is in contact with said grounding terminal, and an OFF state when the swingable end of said blade is held at an intermediate position between said bus line terminal and said grounding terminal.

3. The metal-enclosed switchgear according to claim 1, wherein said insulator tube includes an insulating barrier as an integral art of said insulator tube, surrounding at least one of peripheral parts of a stationary conductor side exposed portion of said vacuum-valve breaker, a portion of a side wall of said insulator tube where said connecting conductor passes through, and said blade support member.

4. The metal-enclosed switchgear according to claim 3, wherein said insulating barrier surrounds the peripheral part of the stationary conductor side exposed portion of said vacuum-valve breaker at an insulation barrier height larger than maximum height of the stationary conductor side exposed portion.

5. The metal-enclosed switchgear according to claim 3, wherein
said insulating barrier surrounds the peripheral part of the stationary conductor side exposed portion of said vacuum-valve breaker, the stationary conductor side exposed portion decreasing in width, with height, and in steps,
an insulation barrier height is made larger than the height of a part of the stationary conductor side exposed portion where the width of the stationary conductor side exposed portion is largest.

6. The metal-enclosed switchgear according to claim 3, including more than one set of said vacuum-valve breaker, said insulator tube, and said disconnector arranged parallel to each other for switching respective phases of multiple phases, with a phase-to-phase insulating distance of 100 to 110 mm between conductor portions of adjacent phases, each set including at least one of said connecting conductor and said blade support member, and a insulating distance of 100 to 110 mm between said conductor portions and said metallic enclosure, said conductor portion and said insulating barrier of each phase being separated by an insulating distance of 15 to 30 mm in a direction in which said insulator tubes of the individual phases are arranged.

7. The metal-enclosed switchgear according to claim 1, wherein said insulator tube is produced by molding a resin material so that an inner wall surface of said insulator tube is inclined with respect to the axial direction.

8. The metal-enclosed switchgear according to claim 1, wherein said insulator tube is in tight contact with an outer surface of said vacuum-valve breaker except at a portion of said movable electrode rod.

9. The metal-enclosed switchgear according to claim 1, wherein said metallic enclosure has a hermetically sealed structure in which a gas is sealed at a pressure higher than atmospheric pressure, said gas being selected from the group consisting of:

(1) dehydrated air;
(2) nitrogen;
(3) a mixture of nitrogen and oxygen;
(4) a mixture of nitrogen, oxygen, and air;
(5) sulfur hexafluoride;
(6) a mixture of sulfur hexafluoride and nitrogen;
(7) a mixture of sulfur hexafluoride and air; and
(8) a mixture of sulfur hexafluoride and dehydrated air.

* * * * *